United States Patent
Casey et al.

(10) Patent No.: US 12,327,479 B2
(45) Date of Patent: Jun. 10, 2025

(54) SYSTEMS AND METHODS FOR IMPLEMENTING AN AIR TRAFFIC CONTROL VOICE RELAY FOR UNMANNED AIRCRAFT SYSTEMS OVER AN AVIATION NETWORK

(71) Applicant: Aura Network Systems, Inc., McLean, VA (US)

(72) Inventors: Tamara Lynne Casey, Annapolis, MD (US); Michael Robert Gagne, Monrovia, MD (US); Michael Ligouri Moher, Ottawa (CA)

(73) Assignee: AURA Network Systems, Inc., McLean, VA (US)

( * ) Notice: Subject to any disclaimer, the term of this patent is extended or adjusted under 35 U.S.C. 154(b) by 201 days.

(21) Appl. No.: 18/152,608

(22) Filed: Jan. 10, 2023

(65) Prior Publication Data
US 2023/0245571 A1  Aug. 3, 2023

Related U.S. Application Data

(60) Provisional application No. 63/325,030, filed on Mar. 29, 2022, provisional application No. 63/299,316, filed on Jan. 13, 2022.

(51) Int. Cl.
*G08G 5/26* (2025.01)
*G08G 5/21* (2025.01)
(Continued)

(52) U.S. Cl.
CPC ............... *G08G 5/26* (2025.01); *G08G 5/21* (2025.01); *G08G 5/25* (2025.01); *G08G 5/30* (2025.01);
(Continued)

(58) Field of Classification Search
None
See application file for complete search history.

(56) References Cited

U.S. PATENT DOCUMENTS

| 4,347,513 A | 8/1982 | Schindler |
| 6,018,659 A | 1/2000 | Ayyagari et al. |
| (Continued) | | |

FOREIGN PATENT DOCUMENTS

| CA | 2189494 A1 | 5/1997 |
| CN | 108173590 A | 6/2018 |
| (Continued) | | |

OTHER PUBLICATIONS

Mulkerin, "L-Band Commercial Communications Service for Unmanned Aircraft Systems", 2007 Integrated Communications, Navigation and Surveillance Conference, pp. 1-8 (Year: 2007).*

(Continued)

*Primary Examiner* — Tamara L Weber
(74) *Attorney, Agent, or Firm* — Kubota & Basol LLP

(57) ABSTRACT

Provided herein are systems and methods for implementing air traffic control (ATC) voice communications over a digital aviation network, which allows one or more pilots on the ground to communicate with ATC controllers while piloting a UAS transiting the airspace of a particular ATC voice station. In one or more examples, a spectrum management system (or the ATC voice controller using information received from the spectrum management system) may designate a relay aircraft to relay very high frequency (VHF) ATC voice to operators/pilots on the aviation network. In one or more examples, upon initiation of voice communications by ATC to all UAS and other aircraft in a VHF service area or sector, the ATC analog voice message may be received by a VHF radio on the relay aircraft. In one or more (Continued)

examples, the relay aircraft may then relay the digital message to the ATC voice processor and/or base station.

24 Claims, 18 Drawing Sheets

(51) Int. Cl.
| | |
|---|---|
| *G08G 5/25* | (2025.01) |
| *G08G 5/30* | (2025.01) |
| *G08G 5/55* | (2025.01) |
| *G08G 5/57* | (2025.01) |
| *G08G 5/72* | (2025.01) |
| *H04B 7/185* | (2006.01) |

(52) U.S. Cl.
CPC ............... *G08G 5/55* (2025.01); *G08G 5/57* (2025.01); *G08G 5/727* (2025.01); *H04B 7/18504* (2013.01); *H04B 7/18506* (2013.01)

(56) References Cited

U.S. PATENT DOCUMENTS

| | | | |
|---|---|---|---|
| 6,163,681 | A | 12/2000 | Wright et al. |
| 6,167,239 | A | 12/2000 | Wright et al. |
| 6,944,475 | B1 | 9/2005 | Campbell |
| 8,615,263 | B2 | 12/2013 | Madon et al. |
| 8,897,770 | B1 | 11/2014 | Frolov et al. |
| 8,914,022 | B2 | 12/2014 | Kostanic et al. |
| 9,185,603 | B1 | 11/2015 | McCarthy |
| 9,319,172 | B2 | 4/2016 | Jalali et al. |
| 9,596,053 | B1 | 3/2017 | Marupaduga et al. |
| 9,734,723 | B1 | 8/2017 | Bruno et al. |
| 10,205,508 | B1* | 2/2019 | Lindsley ............... G05D 1/0022 |
| 10,304,343 | B2 | 5/2019 | Mustafic et al. |
| 10,354,536 | B1 | 7/2019 | Hegranes et al. |
| 10,372,122 | B2 | 8/2019 | Zach |
| 10,531,505 | B2* | 1/2020 | Gagne ............... G01S 19/07 |
| 10,880,070 | B1 | 12/2020 | Delaney et al. |
| 11,603,200 | B2 | 3/2023 | Bruhn |
| 11,804,141 | B2 | 10/2023 | Chase et al. |
| 2001/0052875 | A1 | 12/2001 | Kohno et al. |
| 2005/0108374 | A1 | 5/2005 | Pierzga et al. |
| 2007/0072560 | A1 | 3/2007 | Ishikawa |
| 2008/0274734 | A1 | 11/2008 | Kostanic et al. |
| 2010/0234024 | A1 | 9/2010 | Mcguffin |
| 2011/0116373 | A1 | 5/2011 | Lauer |
| 2011/0257874 | A1 | 10/2011 | Judd et al. |
| 2012/0270531 | A1 | 10/2012 | Wright et al. |
| 2012/0282962 | A1 | 11/2012 | Madon et al. |
| 2014/0024365 | A1 | 1/2014 | Mitchell |
| 2014/0274103 | A1 | 9/2014 | Steer et al. |
| 2015/0139073 | A1 | 5/2015 | Buchwald et al. |
| 2016/0119938 | A1 | 4/2016 | Frerking et al. |
| 2016/0275801 | A1 | 9/2016 | Kopardekar |
| 2017/0059688 | A1 | 3/2017 | Gan |
| 2017/0111271 | A1 | 4/2017 | Thubert et al. |
| 2017/0215178 | A1 | 7/2017 | Kim et al. |
| 2017/0278410 | A1 | 9/2017 | Byers et al. |
| 2017/0293307 | A1 | 10/2017 | Frolov et al. |
| 2018/0061251 | A1 | 3/2018 | Venkatraman et al. |
| 2018/0113206 | A1 | 4/2018 | Pokrass et al. |
| 2018/0164441 | A1 | 6/2018 | Feria et al. |
| 2018/0231655 | A1 | 8/2018 | Stark et al. |
| 2018/0324881 | A1 | 11/2018 | Gagne |
| 2018/0375568 | A1 | 12/2018 | De Rosa et al. |
| 2019/0012923 | A1 | 1/2019 | Weisbrod et al. |
| 2019/0260462 | A1 | 8/2019 | Axmon et al. |
| 2019/0306675 | A1 | 10/2019 | Xue et al. |
| 2019/0331800 | A1 | 10/2019 | Espeland et al. |
| 2020/0043351 | A1 | 2/2020 | Hunter |
| 2020/0154426 | A1 | 5/2020 | Takács et al. |
| 2020/0184739 | A1 | 6/2020 | Nathan et al. |
| 2020/0258405 | A1* | 8/2020 | Fern ............... G08G 5/0039 |
| 2020/0266903 | A1 | 8/2020 | De Rosa et al. |
| 2020/0372808 | A1 | 11/2020 | Carraway et al. |
| 2021/0035457 | A1 | 2/2021 | Pennapareddy |
| 2021/0118312 | A1 | 4/2021 | Takács |
| 2021/0241632 | A1 | 8/2021 | Mustafic et al. |
| 2021/0282129 | A1 | 9/2021 | Kim et al. |
| 2022/0166525 | A1 | 5/2022 | De Rosa et al. |
| 2022/0217706 | A1 | 7/2022 | Casey et al. |
| 2022/0302968 | A1 | 9/2022 | Casey et al. |
| 2022/0383760 | A1 | 12/2022 | Casey et al. |
| 2023/0208506 | A1* | 6/2023 | Ji ............... G08G 5/0013 |
| 2024/0089741 | A1 | 3/2024 | Tarraf et al. |
| 2024/0224309 | A1 | 7/2024 | Casey et al. |

FOREIGN PATENT DOCUMENTS

| | | |
|---|---|---|
| CN | 109450515 A | 3/2019 |
| CN | 112116830 A | 12/2020 |
| EP | 1485729 B1 | 5/2008 |
| EP | 1975822 A1 | 10/2008 |
| KR | 1788721 B1 | 10/2017 |
| WO | 2007020475 A1 | 2/2007 |
| WO | 2016030656 A1 | 3/2016 |
| WO | 2018178750 A1 | 10/2018 |
| WO | 2019086821 A1 | 5/2019 |
| WO | 2020113062 A1 | 6/2020 |
| WO | 2020263393 A9 | 2/2021 |
| WO | 2022217530 A1 | 10/2022 |
| WO | 2023049588 A1 | 3/2023 |
| WO | 2023194013 A1 | 10/2023 |

OTHER PUBLICATIONS

Kampichler et al. "Location Based Communication Services for UAS in the NAS", 2016 IEEE/AIAA 35th Digital Avionics Systems Conference (DASC), pp. 1-7 (Year: 2016).*
Casey et al., U.S. Office Action mailed Mar. 3, 2023, directed to U.S. Appl. No. 17/569,379; 21 pages.
International Search Report and Written Opinion dated Mar. 21, 2023, directed to International Application No. PCT/ JS2023/ 060402; 12 pages.
International Search Report and Written Opinion mailed Apr. 19, 2022, directed to International Application No. PCT/ JS2022/ 070050; 12 pages.
Final Office Action received for U.S. Appl. No. 17/580,292, mailed on Feb. 2, 2023, 25 pages.
Final Office Action received for U.S. Appl. No. 17/569,379, mailed on Jul. 26, 2023, 22 pages.
Final Office Action received for U.S. Appl. No. 17/829,887, mailed on Aug. 30, 2024, 26 pages.
International Search Report received for PCT Patent Application No. PCT/US2022/070272, mailed on Apr. 22, 2022, 5 pages.
International Search Report received for PCT Patent Application No. PCT/US2022/072699, mailed on Sep. 21, 2022, 5 pages.
International Search Report received for PCT Patent Application No. PCT/US2023/069999, mailed on Oct. 31, 2023, 5 pages.
International Search Report received for PCT Patent Application No. PCT/US2024/029807, mailed on Sep. 24, 2024, 6 pages.
Non-Final Office Action received for U.S. Appl. No. 17/580,292, mailed on Jun. 26, 2023, 26 pages.
Non-Final Office Action received for U.S. Appl. No. 17/580,292, mailed on Oct. 3, 2022, 24 pages.
Non-Final Office Action received for U.S. Appl. No. 17/829,887, mailed on Apr. 16, 2024, 25 pages.
Notice of Allowance received for U.S. Appl. No. 17/569,379, mailed on Dec. 19, 2023, 11 pages.
Notice of Allowance received for U.S. Appl. No. 17/580,292, mailed on Nov. 8, 2023, 8 pages.
Notice of Allowance received for U.S. Appl. No. 18/608,692, mailed on Oct. 7, 2024, 13 pages.
Apaza, et al., "A New Spectrum Management Concept for Future NAS Communications", 2020 AIAA/IEEE 39th Digital Avionics Systems Conference (DASC), San Antonio, TX, USA, 2020, pp. 1-7.

(56) References Cited

OTHER PUBLICATIONS

Jacob, et al., "Cognitive Radio for Aeronautical Communications: A Survey", IEEE Access, vol. 4, May 19, 2016, pp. 3417-3443.
Jacob, et al., "Efficient Aviation Spectrum Management Through Dynamic Frequency Allocation", IEEE, 2015, pp. L3-1-L3-9.
Knoblock, E. J., et al., "Investigation and Evaluation of Advanced Spectrum Management Concepts for Aeronautical Communications", 2021 Integrated Communications Navigation and Surveillance Conference (ICNS), 2021, pp. 1-12.
Reyes, et al., "A Cognitive Radio System for Improving the Reliability and Security of UAS/UAV Networks", IEEE, 2015, 9 pages.
Ribeiro, et al., "A Framework for Dimensioning VDL-2 Air-ground Networks", 2014 Integrated Communications, Navigation and Surveillance Conference (ICNS) Conference Proceedings, Apr. 2014, pp. Q3-1-Q3-14.
Wang, et al., "Blockchain Enabled Verification for Cellular-Connected Unmanned Aircraft System Networking", Future Generation Computer Systems, May 2021, pp. 233-244.

\* cited by examiner

SYSTEMS AND METHODS FOR IMPLEMENTING AN AIR TRAFFIC CONTROL VOICE RELAY FOR UNMANNED AIRCRAFT SYSTEMS OVER AN AVIATION NETWORK

CROSS REFERENCE TO RELATED APPLICATION

This application claims the benefit of U.S. Provisional Application No. 63/299,316, filed Jan. 13, 2022, and U.S. Provisional Application No. 63/325,030, filed Mar. 29, 2022, the entire contents of each of which are incorporated herein by reference.

FIELD

The present disclosure relates generally to systems and methods for transmitting and receiving air traffic control voice audio and in particular to systems and methods for coordinating and managing air traffic control voice communications over a digital aviation network using a flight-plan based spectrum management system.

BACKGROUND

For both manned and unmanned flights operating in controlled air space, it is critical to maintain continuous communications between pilot, airborne asset, and Air Traffic Control (ATC). To integrate unmanned aircraft system(s) (UAS) into the national airspace, it will be desirable to make the administration and oversight of UAS traffic compatible with the traditional administration and oversight of manned air traffic. For instance, when a manned aircraft (that is piloted by a human pilot) is in controlled air space, its movements are coordinated by an air traffic controller who uses voice communications to direct pilots as to what altitude, speed, and heading they should be at. Communications with ATC can not only be critical while an aircraft is in flight, but can be just as critical when an aircraft is on the ground. Since the movement of a UAS will also need to be coordinated with manned aircraft, a UAS pilot will also need to be able to converse with ATC in the same manner as a manned aircraft pilot.

In the case of traditional manned aircraft, ATC voice communications (which are generated from a location proximal to the aircraft) can be transmitted directly to pilot, since the pilot is located in the aircraft. In contrast, UAS operators may be controlling the aerial asset from any network connected location, and is not required to be within the communication range of an ATC transmission. Thus, when an ATC voice transmission is directed to a UAS that is within range of the ATC facility, the UAS will have to direct the received transmission to its pilot, in order for the pilot to receive the message. Similarly, if the pilot of a UAS wants to communicate with the ATC facility that is coordinating the movements of its UAS, they will have to direct a voice communication to their UAS, which in turn can then direct the transmission to the ATC. In such a system, the UAS can effectively act as a communications relay between the pilot and ATC.

The UAS-as-Relay paradigm however can present challenges to an aviation network. The requirement to maintain an operational data link and provide an ATC voice relay between the UAS and pilots can exhaust spectrum resources causing channel requirements to exceed channel capacity. Thus, a system for transmitting ATC voice audio in a manner that preserves spectral resources for operation data links, is desirable and necessary for integrating ATC voice audio with a digital aviation network.

SUMMARY

According to an aspect, a terrestrial (i.e., ground) to air communications network can include a spectrum management system configured to leverage a wireless network (Aviation Network) designed to manage the command and control of UAS. In one or more examples, the spectrum management systems operates by referencing a submitted flight plan against the service capabilities and spectrum resources of both the aviation network and ATC voice service and designating an optimal UAS relay or terrestrial relay node to transmit communications between UAS operators and the ATC voice network. In one or more examples, the Aviation Network may include the spectrum management system, an aviation network core (i.e., ATC voice processor), one or more aerial assets, such as manned aerial vehicles and/or UAVs that may communicate with one or more base stations (or aviation network sites) that are in communication with the aerial assets, one or more terrestrial relay nodes (or base station towers) in communication with the base station and aerial assets, and one or more operators/pilots in communication with the base station and aerial assets.

In one or more examples, a pilot (or other entity such as an administrator or organization who runs unmanned aircraft) wishing to operate a UAS flight transmits a flight plan to a spectrum management system that is configured to manage the radio frequency (RF) spectrum in a given air space. In one or more examples, the flight plan can include the intended geographic route of the aircraft, the beginning time of the flight, the expected end time of the flight, as well as operational details of the flight, such as the data throughput requirement and the radio configuration of the aircraft. In one or more examples, and based on the received flight plan, the spectrum management system can allocate an RF spectrum frequency "slot" (i.e., timeslot, sub-channel, or resource block) for the aircraft to use during its intended flight. In one or more examples, the spectrum management system can choose what spectrum slot to give an aircraft based not only on its flight plan but on other various factors such as a dynamic link budget created for the flight, dynamic RF coverage predictions, and dynamic interference and co-existence (i.e., with other aircraft in time, space, and RF channel utilization) predictions. The spectrum management system can take into account available spectrum as well as the predicted network traffic and their spectrum allocations to determine an RF spectrum slot that can provide a stable and continuous communications channel to the aircraft during its flight.

In one or more examples, once a flight plan is submitted to a spectrum management system of a digital aviation network, the system can determine RF availability for both operational data links and ATC voice links for the duration of the flight specified by the flight plan. Once the spectrum management system has confirmed RF availability and approves the submitted flight plan, in one or more examples, a Ground Base Station Scheduler at a base station of the digital aviation network (working in conjunction with the spectrum management system and an ATC voice controller) can create and maintain ATC RF voice links between one or more aircraft in the digital aviation network. In one or more examples, the spectrum management system (or the ATC voice controller using information received from the spectrum management system) may designate a relay aircraft to relay very high frequency (VHF) ATC voice to operators/pilots on the aviation network within an assigned VHF service area or sectors. In one or more examples, the spectrum management system may identify one or more UAS in a VHF service area or sector of ATC voice as the "relay aircraft" based upon best coverage and information from the submitted flight plan (e.g., duration, speed, elevation, relationship to ATC frequency geofenced area or sector etc.). In one or more examples, upon initiation of voice communications by ATC to all UAS and other aircraft in a VHF service area or sector, the ATC analog voice message may be received by a VHF radio on the relay aircraft and a vocoder on the relay aircraft may convert the analog message to a digital message. In one or more examples, the relay aircraft may then relay the digital message to the ATC voice processor and/or base station. In one or more examples, the ATC voice processor can copy and forward the digital message to pilots operating a UAS within the VHF service area or sector assigned to the same VHF frequency.

In one or more examples, the aviation network can also be configured to dynamically assign a relay aircraft based upon the timing of a request to transmit. In one or more examples, and in the case in which the relay assignment is dynamic, all UAS in an ATC voice group can have the ability to receive the ATC to Pilot voice transmission through their respective onboard VHF radios. In one or more examples, when ATC initiates the VHF voice transmission to a pilot, all UAS VHF radios assigned to the VHF frequency (i.e., the ATC voice group) can receive the information. In one or more examples, each UAS radio can convert the received ATC VHF signal from analog to digital via a vocoder and can then request a radio resource from the ground base station. In one or more examples, the ground base station will only have the radio resources assigned to it by the spectrum management system, and thus will process only the first initiated request from all UAS assigned to that VHF frequency. In one or more examples, all other requests during the active transmission from ATC along the VHF frequency will be rejected by the system allowing only one ATC to Pilot transmission to occur. In one or more examples, if the aviation network is setup to allow more radio links from the UAS to the ground-based radio, duplicate transmissions received by the aviation network core (ATC processor) can manage the delivery of the message ignoring duplicate messages. In one or more examples, the selection of the message to forward by the ATC voice processor could be based upon time, radio link quality or even priority access assigned to the airborne radio and pilot.

In one or more examples, the Aviation Network core (ATC voice processor) and the ground base station using the defined spectrum resources of the spectrum management system may also relay pilot communications directed to ATC to both ATC and to all other pilots/operators within an assigned VHF service area or sector. In one or more examples, if any pilot/operator initiates communications to ATC, the pilot/operator voice will be converted to a digital message by a vocoder and then transmitted to the ATC Voice Processor=and/or base station. In one or more examples, upon receipt at the ATC voice processor and/or base station, a copy of the digital message will be multicast to pilots operating a UAS on the aviation network within the VHF service area or sector. In one or more examples, upon receipt of the digital message at the communicating pilot's UAS, the digital voice can be converted to analog via a vocoder on the UAS and relayed to ATC and all other aircraft on the assigned VHF frequency via the on-board VHF radio.

In one or more examples, the ATC voice processor may alternatively be configured to relay communications from ATC to pilot/operator via a ground based VHF relay (i.e., a relay node). In one or more examples, if the ATC voice processor is configured to relay ATC to pilot communications via a ground based VHF relay, ATC may initiate voice communication to every aircraft via a terrestrial relay node and the relay node will then relay the ATC VHF message to all pilots within the VHF service area in the manner described below. In one or more examples, upon receipt of an ATC analog voice message by VHF radio at the relay node, a vocoder at the relay node will convert the voice message to a digital format. In one or more examples, the relay node will then relay the digital voice message to the ATC voice processor located at the base station and/or within the Aviation Network core. In one or more examples, the ATC voice processor will then copy and forward (Multicast) the message to pilots operating UAS within the VHF service area. Benefits of relaying ATC voice to pilots/operators by terrestrial VHF relay may include reduced latency and enhanced voice quality resulting from a higher rate vocoder.

In one or more examples, the Aviation Network core (ATC voice processor) and the ground base station using the defined spectrum resources of the spectrum management system may alternatively be configured to manage communications from ATC to pilot/operator by hybrid UAS VHF relay. In one or more examples, if the aviation network is configured to manage communications by hybrid UAS VHF relay, the system may relay ATC voice communications to pilots/operators through a relay aircraft or relay node substantially as described above. The hybrid relay model may be beneficial where there are coverage holes within the ATC VHF Voice system where a properly place terrestrial based VHF relay would be placed to ensure all pilots on the aviation network would receive the messages in the identified coverage hole. In other words, there may be instances in which it is impossible to relay ATC communications via a UAS relay, and in such circumstances, the communications could instead be relayed via a terrestrial VHF relay.

In one or more examples, the Aviation Network core and the spectrum resources of the ground-based radio defined by the spectrum management system may also be configured to manage the designated relay UAS leaving the VHF service area. In one or more examples, a new relay aircraft may need to be identified if the current relay aircraft completes its flight plan (i.e., lands), is assigned a new VHF frequency by ATC, is no longer the optimal relay point as determined by the spectrum management system or is otherwise unable to continue operating as the relay aircraft. In one or more examples, if a new relay aircraft is needed, the spectrum management system will assign a new relay aircraft based upon best coverage and flight plan. In one or more examples, the spectrum management system may also configure the aviation network core and the ground base stations to manage one or more UAS moving from one VHF service area to a different VHF service area. In one or more examples if their only remains a single UAS on a VHF frequency, by default this UAS is the relay aircraft.

In one or more examples, the ATC voice processor can work in conjunction with the spectrum management system to ensure that pilots on the digital aviation network are tuned to the correct ATC voice VHF frequency based on their position. For instance in one or more examples, the spectrum management system can define all associated VHF frequencies to the areas or sectors covered by a ground-based station on the aviation network, and can define the VHF frequency for each area or sector served by the ground base station to the ATC voice processor. In one or more examples, if the ATC voice processor determines that a pilot's tuned VHF frequency does not match the frequency expected by the spectrum management system, then in one or more examples, the ATC voice processor can alert the pilot to the discrepancy. In one or more examples, the base station scheduler can update the assigned spectrum resources for each aircraft based upon information provided by the spectrum management system during a flight, thus ensuring that the proper amount of radio resources are always available for ATC voice traffic.

In one or more examples, the digital aviation network can process and relay all ATC voice traffic through a ground-based relay (as opposed to a UAS relay) so as to relay communications between ATC and individual pilots in both directions. In one or more examples, a ground-based relay could be used for aircraft that are on or near the ground, and are communication with ATC.

In one or more examples, the aviation network core configured for ATC voice can allow for the aviation network core (ATC voice processor) to manage ATC voice communication from pilots that may occur near simultaneously. In the examples of manned ATC voice communications, it is possible for pilots to near simultaneously initiate ATC voice communications. In doing so they may interfere or step on each other making one or both messages degraded and not received or understood by ATC. In one or more examples, the ATC voice processor of the digital aviation network can avoid pilots "stepping" on one another by allowing a first message (from a first pilot) to be received and relayed, while placing the other message (from a second pilot) in a queue until that message can be delivered thus ensuring both messages are delivered to ATC and the other pilots on the aviation network.

According to one or more examples of the disclosure, a system for facilitating voice communications between an air traffic control voice station and one or more pilots operating one or more aircraft in an air-to-ground communications network comprises: a memory, one or more processors, wherein the memory stores one or more programs that when executed by the one or more processors, cause the one or more processors to: receive one or more flight plans associated with the one or more aircraft, wherein each flight plan comprises timing, location, and altitude information for a flight that is to fly in one or more coverage areas of the air-to-ground communications network, for each aircraft of the one or more aircraft, determine an availability of an RF communications link, and an availability of an air traffic control (ATC) voice communications link based on the received one or more flight plans, generate an RF communications link at a base station of the communications network between the aircraft and the pilot of the one or more pilots associated with the aircraft based on the received one or more flight plans, assign each aircraft of the one or more aircraft to an air traffic control (ATC) voice group of a plurality of ATC voice groups, and generate a digital voice communication link with an aircraft of the one or more aircraft based on the assigned air traffic control (ATC) voice group of the aircraft and the received one or more flight plans.

Optionally, generating a digital voice communication link with an aircraft of the one or more aircraft comprises selecting the aircraft to act as a designated relay for the ATC voice group based on the received one or more flight plans associated with each aircraft that is assigned to the ATC voice group.

Optionally, the one or more processors are caused to: receive an ATC digital voice communication from the designated relay aircraft over the digital voice communication link, generate a plurality of copies of the received ATC voice digital voice communication, and transmit the plurality of copies of the received ATC voice digital communication to each pilot associated with the one or more aircraft in the ATC voice group.

Optionally, the ATC digital voice communication is based on an analog voice communication transmitted by an ATC voice station.

Optionally, the analog voice transmission is received by a radio located on the designated relay aircraft for the ATC voice group, and to the ATC digital voice communication using a converter located on the designated relay aircraft.

Optionally, the designated relay aircraft transmits the ATC digital voice communication to the system using the digital voice communication link.

Optionally, generating a digital voice communication link with an aircraft of the one or more aircraft comprises: receiving an ATC digital voice communication from a pilot of the one or more pilots, determining an aircraft of the one or more aircraft associated with the pilot, and generating the digital voice communication link with the aircraft associated with the pilot.

Optionally, the one or processors are caused to: generate a plurality of copies of the received ATC voice digital voice communication, and transmit the plurality of copies of the received ATC voice digital communication to each pilot associated with the one or more aircraft in the ATC voice group.

Optionally, the plurality of copies of the received ATC voice digital communication to each pilot associated with the one or more aircraft in the ATC voice group are transmitted using an internet protocol (IP) connection between each pilot and the system.

Optionally, the one or more processors are caused to: transmit the received digital voice communication to the aircraft associated with the pilot using the generated digital voice communication link.

Optionally, the transmitted digital voice communication is configured to be received by the aircraft associated with the pilot.

Optionally, the transmitted digital voice communication is configured to be converted by a converter on the aircraft to an analog voice communication that is transmitted to an ATC voice station.

Optionally, the ATC digital voice communication received from the pilot is based on an analog voice communication transmitted by the pilot.

Optionally, the digital communication link is generated upon receiving the digital voice communication from the pilot.

Optionally, the one or more processors are caused to: receive an analog voice communication from an ATC voice station, and convert the analog voice communication from the ATC voice station to an ATC digital voice communication.

Optionally, the one or processors are caused to: generate a plurality of copies of the ATC voice digital voice communication, and transmit the plurality of copies of the received ATC voice digital communication to each pilot associated with one or more aircraft of an ATC voice group associated with the ATC voice station.

Optionally, the one or more processors are caused to: receive a command from a pilot of the one or more pilots to change an ATC radio frequency of the aircraft associated with the pilot, transmit the command to the aircraft using the generated RF communications link, and assign the aircraft to an ATC voice group of the one or more ATC voice groups based on the received command from the pilot to change an ATC radio frequency of the aircraft associated with the pilot.

Optionally, each ATC voice group of the plurality of ATC voice groups corresponds to an ATC voice station configured to transmit analog voice communications at a predefined transmission frequency.

Optionally, the ATC voice communications link is configured to transmit analog voice messages from the aircraft to the ATC voice station.

Optionally, the ATC voice communications link uses a VHF frequency to transmit the analog voice message from the aircraft to the ATC voice station.

Optionally, if it is determined that an aircraft of the one or more aircraft does not have an available RF communications link or an available ATC voice communications link based on its flight plan, then send an indication to a sender of the flight indicating that the flight plan has been rejected.

According to one or more examples of the disclosure, a system for facilitating voice communications between an air traffic control voice station and one or more pilots operating one or more aircraft in an air-to-ground communications network comprises: a memory, one or more processors, wherein the memory stores one or more programs that when executed by the one or more processors, cause the one or more processors to: receive one or more flight plans associated with the one or more aircraft, wherein each flight plan comprises timing, location, and altitude information for a flight that is to fly in one or more coverage areas of the air-to-ground communications network, for each aircraft of the one or more aircraft, determine an availability of an RF communications link, and an availability of an air traffic control (ATC) voice communications link based on the received one or more flight plans, generate an RF communications link at a base station of the communications network between the aircraft and the pilot of the one or more pilots associated with the aircraft based on the received one or more flight plans, assign each aircraft of the one or more aircraft to an air traffic control (ATC) voice group of a plurality of ATC voice groups, and generate an analog voice communication link with an air traffic control (ATC) voice station of the one or more aircraft based on the received one or more flight plans.

According to one or more examples of the disclosure, a method for facilitating voice communications between an air traffic control voice station and one or more pilots operating one or more aircraft in an air-to-ground communications network comprises: receiving one or more flight plans associated with the one or more aircraft, wherein each flight plan comprises timing, location, and altitude information for a flight that is to fly in one or more coverage areas of the air-to-ground communications network, for each aircraft of the one or more aircraft, determining an availability of an RF communications link, and an availability of an air traffic control (ATC) voice communications link based on the received one or more flight plans, generating an RF communications link at a base station of the communications network between the aircraft and the pilot of the one or more pilots associated with the aircraft based on the received one or more flight plans, assigning each aircraft of the one or more aircraft to an air traffic control (ATC) voice group of a plurality of ATC voice groups, and generating a digital voice communication link with an aircraft of the one or more aircraft based on the assigned air traffic control (ATC) voice group of the aircraft and the received one or more flight plans.

Optionally, generating a digital voice communication link with an aircraft of the one or more aircraft comprises selecting the aircraft to act as a designated relay for the ATC voice group based on the received one or more flight plans associated with each aircraft that is assigned to the ATC voice group.

Optionally, the method comprises: receiving an ATC digital voice communication from the designated relay aircraft over the digital voice communication link, generating a plurality of copies of the received ATC voice digital voice communication, and transmitting the plurality of copies of the received ATC voice digital communication to each pilot associated with the one or more aircraft in the ATC voice group.

Optionally, the ATC digital voice communication is based on an analog voice communication transmitted by an ATC voice station.

Optionally, the analog voice transmission is received by a radio located on the designated relay aircraft for the ATC voice group, and to the ATC digital voice communication using a converter located on the designated relay aircraft.

Optionally, the designated relay aircraft transmits the ATC digital voice communication to the system using the digital voice communication link.

Optionally, generating a digital voice communication link with an aircraft of the one or more aircraft comprises: receiving an ATC digital voice communication from a pilot of the one or more pilots, determining an aircraft of the one or more aircraft associated with the pilot, and generating the digital voice communication link with the aircraft associated with the pilot.

Optionally, wherein the method comprises: generating a plurality of copies of the received ATC voice digital voice communication, and transmitting the plurality of copies of the received ATC voice digital communication to each pilot associated with the one or more aircraft in the ATC voice group.

Optionally, the plurality of copies of the received ATC voice digital communication to each pilot associated with the one or more aircraft in the ATC voice group are transmitted using an internet protocol (IP) connection between each pilot and the system.

Optionally, the method comprises: transmitting the received digital voice communication to the aircraft associated with the pilot using the generated digital voice communication link.

Optionally, the transmitted digital voice communication is configured to be received by the aircraft associated with the pilot.

Optionally, the transmitted digital voice communication is configured to be converted by a converter on the aircraft to an analog voice communication that is transmitted to an ATC voice station.

Optionally, the ATC digital voice communication received from the pilot is based on an analog voice communication transmitted by the pilot.

Optionally, the digital communication link is generated upon receiving the digital voice communication from the pilot.

Optionally, the method comprises: receiving an analog voice communication from an ATC voice station, and converting the analog voice communication from the ATC voice station to an ATC digital voice communication.

Optionally, the method comprises: generating a plurality of copies of the ATC voice digital voice communication, and transmitting the plurality of copies of the received ATC voice digital communication to each pilot associated with one or more aircraft of an ATC voice group associated with the ATC voice station.

Optionally, the method comprises: receiving a command from a pilot of the one or more pilots to change an ATC radio frequency of the aircraft associated with the pilot, transmitting the command to the aircraft using the generated RF communications link, and assigning the aircraft to an ATC voice group of the one or more ATC voice groups based on the received command from the pilot to change an ATC radio frequency of the aircraft associated with the pilot.

Optionally, each ATC voice group of the plurality of ATC voice groups corresponds to an ATC voice station configured to transmit analog voice communications at a predefined transmission frequency.

Optionally, the ATC voice communications link is configured to transmit analog voice messages from the aircraft to the ATC voice station.

Optionally, the ATC voice communications link uses a VHF frequency to transmit the analog voice message from the aircraft to the ATC voice station.

Optionally, if it is determined that an aircraft of the one or more aircraft does not have an available RF communications link or an available ATC voice communications link based on its flight plan, then send an indication to a sender of the flight indicating that the flight plan has been rejected.

According to one or more examples of the disclosure, a method for facilitating voice communications between an air traffic control voice station and one or more pilots operating one or more aircraft in an air-to-ground communications network comprises: receiving one or more flight plans associated with the one or more aircraft, wherein each flight plan comprises timing, location, and altitude information for a flight that is to fly in one or more coverage areas of the air-to-ground communications network, for each aircraft of the one or more aircraft, determining an availability of an RF communications link, and an availability of an air traffic control (ATC) voice communications link based on the received one or more flight plans, generating an RF communications link at a base station of the communications network between the aircraft and the pilot of the one or more pilots associated with the aircraft based on the received one or more flight plans, assigning each aircraft of the one or more aircraft to an air traffic control (ATC) voice group of a plurality of ATC voice, and generating an analog voice communication link with an air traffic control (ATC) voice station of the one or more aircraft based on the received one or more flight plans.

According to one or more examples, a non-transitory computer readable storage medium storing one or more programs for facilitating voice communications between an air traffic control voice station and one or more pilots operating one or more aircraft in an air-to-ground communications network, for execution by one or more processors of an electronic device that when executed by the device, cause the device to: receive one or more flight plans associated with the one or more aircraft, wherein each flight plan comprises timing, location, and altitude information for a flight that is to fly in one or more coverage areas of the air-to-ground communications network, for each aircraft of the one or more aircraft, determine an availability of an RF communications link, and an availability of an air traffic control (ATC) voice communications link based on the received one or more flight plans, generate an RF communications link at a base station of the communications network between the aircraft and the pilot of the one or more pilots associated with the aircraft based on the received one or more flight plans, assign each aircraft of the one or more aircraft to an air traffic control (ATC) voice group of a plurality of ATC voice groups, and generate a digital voice communication link with an aircraft of the one or more aircraft based on the assigned air traffic control (ATC) voice group of the aircraft and the received one or more flight plans.

Optionally, generating a digital voice communication link with an aircraft of the one or more aircraft comprises selecting the aircraft to act as a designated relay for the ATC voice group based on the received one or more flight plans associated with each aircraft that is assigned to the ATC voice group.

Optionally, the device is caused to: receive an ATC digital voice communication from the designated relay aircraft over the digital voice communication link, generate a plurality of copies of the received ATC voice digital voice communication, and transmit the plurality of copies of the received ATC voice digital communication to each pilot associated with the one or more aircraft in the ATC voice group.

Optionally, the ATC digital voice communication is based on an analog voice communication transmitted by an ATC voice station.

Optionally, the analog voice transmission is received by a radio located on the designated relay aircraft for the ATC voice group, and to the ATC digital voice communication using a converter located on the designated relay aircraft.

Optionally, the designated relay aircraft transmits the ATC digital voice communication to the system using the digital voice communication link.

Optionally, generating a digital voice communication link with an aircraft of the one or more aircraft comprises: receiving an ATC digital voice communication from a pilot of the one or more pilots, determining an aircraft of the one or more aircraft associated with the pilot, and generating the digital voice communication link with the aircraft associated with the pilot.

Optionally, the device is caused to: generate a plurality of copies of the received ATC voice digital voice communication, and transmit the plurality of copies of the received ATC voice digital communication to each pilot associated with the one or more aircraft in the ATC voice group.

Optionally, the plurality of copies of the received ATC voice digital communication to each pilot associated with the one or more aircraft in the ATC voice group are transmitted using an internet protocol (IP) connection between each pilot and the system.

Optionally, the device is caused to: transmit the received digital voice communication to the aircraft associated with the pilot using the generated digital voice communication link.

Optionally, the transmitted digital voice communication is configured to be received by the aircraft associated with the pilot.

Optionally, the transmitted digital voice communication is configured to be converted by a converter on the aircraft to an analog voice communication that is transmitted to an ATC voice station.

Optionally, the ATC digital voice communication received from the pilot is based on an analog voice communication transmitted by the pilot.

Optionally, the digital communication link is generated upon receiving the digital voice communication from the pilot.

Optionally, the device is caused to: receive an analog voice communication from an ATC voice station, and convert the analog voice communication from the ATC voice station to an ATC digital voice communication.

Optionally, the device is caused to: generate a plurality of copies of the ATC voice digital voice communication, and transmit the plurality of copies of the received ATC voice digital communication to each pilot associated with one or more aircraft of an ATC voice group associated with the ATC voice station.

Optionally, the device is caused to: receive a command from a pilot of the one or more pilots to change an ATC radio frequency of the aircraft associated with the pilot, transmit the command to the aircraft using the generated RF communications link, and assign the aircraft to an ATC voice group of the one or more ATC voice groups based on the received command from the pilot to change an ATC radio frequency of the aircraft associated with the pilot.

Optionally, each ATC voice group of the plurality of ATC voice groups corresponds to an ATC voice station configured to transmit analog voice communications at a predefined transmission frequency.

Optionally, the ATC voice communications link is configured to transmit analog voice messages from the aircraft to the ATC voice station.

Optionally, the ATC voice communications link uses a VHF frequency to transmit the analog voice message from the aircraft to the ATC voice station.

Optionally, if it is determined that an aircraft of the one or more aircraft does not have an available RF communications link or an available ATC voice communications link based on its flight plan, then send an indication to a sender of the flight indicating that the flight plan has been rejected.

According to one or more examples of the disclosure, a non-transitory computer readable storage medium storing one or more programs for facilitating voice communications between an air traffic control voice station and one or more pilots operating one or more aircraft in an air-to-ground communications network device that when executed by the device, cause the device to: receive one or more flight plans associated with the one or more aircraft, wherein each flight plan comprises timing, location, and altitude information for a flight that is to fly in one or more coverage areas of the air-to-ground communications network, for each aircraft of the one or more aircraft, determine an availability of an RF communications link, and an availability of an air traffic control (ATC) voice communications link based on the received one or more flight plans, generate an RF communications link at a base station of the communications network between the aircraft and the pilot of the one or more pilots associated with the aircraft based on the received one or more flight plans, assign each aircraft of the one or more aircraft to an air traffic control (ATC) voice group of a plurality of ATC voice, and generate an analog voice communication link with an air traffic control (ATC) voice station of the one or more aircraft based on the received one or more flight plans.

In one or more examples, a system for facilitating voice communications between an air traffic control voice station and one or more pilots operating one or more aircraft in an air-to-ground communications network comprises: a memory, one or more processors, wherein the memory stores one or more programs that when executed by the one or more processors, cause the one or more processors to: receive one or more flight plans associated with the one or more aircraft, wherein each flight plan comprises timing, location, and altitude information for a flight that is to fly in one or more coverage areas of the air-to-ground communications network, for each aircraft of the one or more aircraft, determine an availability of an RF communications link, and an availability of an air traffic control (ATC) voice communications link based on the received one or more flight plans, generate an RF communications link at a base station of the communications network between the aircraft and the pilot of the one or more pilots associated with the aircraft based on the received one or more flight plans, assign each aircraft of the one or more aircraft to an air traffic control (ATC) voice group of a plurality of ATC voice groups and generate a digital voice communication link with an aircraft of the one or more aircraft based on the assigned air traffic control (ATC) voice group of the aircraft and the received one or more flight plans.

Optionally, generating a digital voice communication link with an aircraft of the one or more aircraft comprises selecting the aircraft to act as a designated relay for the ATC voice group based on the received one or more flight plans associated with each aircraft that is assigned to the ATC voice group.

Optionally, where the one or more processors are caused to: receive an ATC digital voice communication from the designated relay aircraft over the digital voice communication link, generate a plurality of copies of the received ATC voice digital voice communication, and transmit the plurality of copies of the received ATC voice digital communication to each pilot associated with the one or more aircraft in the ATC voice group.

Optionally, the ATC digital voice communication is based on an analog voice communication transmitted by an ATC voice station.

Optionally, the analog voice transmission is received by a radio located on the designated relay aircraft for the ATC voice group, and to the ATC digital voice communication using a converter located on the designated relay aircraft.

Optionally, the designated relay aircraft transmits the ATC digital voice communication to the system using the digital voice communication link.

Optionally, the one or more processors are caused to: detect a failure of the digital voice communication link from the designated relay aircraft, if a failure of the digital voice communication link is detected, receive an ATC voice communication from a terrestrial relay node, generate a plurality of copies of the received ATC voice communication, and transmit the plurality of copies of the received ATC voice communication to each pilot associated with the one or more aircraft in the ATC voice group.

Optionally, the terrestrial relay node comprises: a ground-based receiver configured to receive the ATC voice communication from an ATC voice station associated with the terrestrial relay node, and a ground-based transmitter configured to transmit the received ATC voice communications to the one or more processors.

Optionally, the terrestrial relay node is configured to: receive an analog voice communication from an ATC voice station, convert the analog voice communication from the ATC voice station to an ATC digital voice communication, and transmit the converted digital voice communication to the one or more processors.

Optionally, the terrestrial relay node is configured to: receive an analog voice communication from an ATC voice station, and transmit the analog voice communication from the ATC voice station to the one or more processors.

Optionally, the one or more processors are caused to: convert the analog voice communication from the ATC voice station to an ATC digital voice communication.

Optionally, the terrestrial relay node is ground-based and is located such that the terrestrial relay lode can communicate with an ATC voice station using a VHF communications link.

Optionally, the terrestrial relay node is communicatively coupled to the one or more processors using a wired physical connection.

Optionally, generating a digital voice communication link with an aircraft of the one or more aircraft comprises: receiving an ATC digital voice communication from a pilot of the one or more pilots, determining an aircraft of the one or more aircraft associated with the pilot, and generating the digital voice communication link with the aircraft associated with the pilot.

Optionally, the one or processors are caused to: generate a plurality of copies of the received ATC voice digital voice communication, and transmit the plurality of copies of the received ATC voice digital communication to each pilot associated with the one or more aircraft in the ATC voice group.

Optionally, the plurality of copies of the received ATC voice digital communication to each pilot associated with the one or more aircraft in the ATC voice group are transmitted using an internet protocol (IP) connection between each pilot and the system.

Optionally, the one or more processors are caused to: transmit the received digital voice communication to the aircraft associated with the pilot using the generated digital voice communication link.

Optionally, the transmitted digital voice communication is configured to be received by the aircraft associated with the pilot.

Optionally, the transmitted digital voice communication is configured to be converted by a converter on the aircraft to an analog voice communication that is transmitted to an ATC voice station.

Optionally, the ATC digital voice communication received from the pilot is based on an analog voice communication transmitted by the pilot.

Optionally, wherein the digital communication link is generated upon receiving the digital voice communication from the pilot.

Optionally, wherein the one or more processors are caused to: detect a failure of the digital voice communication link with the aircraft associated with the pilot; and if a failure of the digital voice communication link is detected, transmit the ATC digital voice communication from the pilot of the one or more pilots to a terrestrial relay node.

Optionally, the terrestrial relay node comprises: a ground-based receiver configured to receive the ATC digital voice communication from one or more processors, and a ground-based transmitter configured to transmit the received he ATC digital voice communication to an ATC voice station associated with the terrestrial relay node.

Optionally, the terrestrial relay node is configured to: receive a digital voice communication from the one or more processors, convert the digital voice communication from the one or more processors to an analog voice communication, and transmit the converted digital voice communication to the ATC voice station.

Optionally, the terrestrial relay node is configured to: receive an analog voice communication from the one or more processors, and transmit the analog voice communication from the one or more processors to the ATC voice station.

Optionally, the terrestrial relay node is ground-based and is located such that the terrestrial relay lode can communicate with an ATC voice station using a VHF communications link.

Optionally, the terrestrial relay node is communicatively coupled to the one or more processors using a wired physical connection.

Optionally, the one or more processors are caused to: detect a failure of the digital voice communication link with the aircraft associated with the pilot; and if a failure of the digital voice communication link is detected, transmit the ATC digital voice communication from the pilot of the one or more pilots to a UAS associated with another pilot of the one or more pilots in the same ATC voice group as the pilot.

In one or more examples, a method for facilitating voice communications between an air traffic control voice station and one or more pilots operating one or more aircraft in an air-to-ground communications network, the method comprises: receiving one or more flight plans associated with the one or more aircraft, wherein each flight plan comprises timing, location, and altitude information for a flight that is to fly in one or more coverage areas of the air-to-ground communications network, for each aircraft of the one or more aircraft, determine an availability of an RF communications link, and an availability of an air traffic control (ATC) voice communications link based on the received one or more flight plans, generating an RF communications link at a base station of the communications network between the aircraft and the pilot of the one or more pilots associated with the aircraft based on the received one or more flight plans, assigning each aircraft of the one or more aircraft to an air traffic control (ATC) voice group of a plurality of ATC voice groups, and generating a digital voice communication link with an aircraft of the one or more aircraft based on the assigned air traffic control (ATC) voice group of the aircraft and the received one or more flight plans.

Optionally, generating a digital voice communication link with an aircraft of the one or more aircraft comprises selecting the aircraft to act as a designated relay for the ATC voice group based on the received one or more flight plans associated with each aircraft that is assigned to the ATC voice group.

Optionally, the method comprises: receiving an ATC digital voice communication from the designated relay aircraft over the digital voice communication link, generating a plurality of copies of the received ATC voice digital voice communication, and transmitting the plurality of copies of the received ATC voice digital communication to each pilot associated with the one or more aircraft in the ATC voice group.

Optionally, the ATC digital voice communication is based on an analog voice communication transmitted by an ATC voice station.

Optionally, the analog voice transmission is received by a radio located on the designated relay aircraft for the ATC voice group, and to the ATC digital voice communication using a converter located on the designated relay aircraft.

Optionally, the designated relay aircraft transmits the ATC digital voice communication to the pilots using the digital voice communication link.

Optionally, the method comprises: detecting a failure of the digital voice communication link from the designated relay aircraft, if a failure of the digital voice communication link is detected, receive an ATC voice communication from a terrestrial relay node, generating a plurality of copies of the received ATC voice communication, and transmitting the plurality of copies of the received ATC voice communication to each pilot associated with the one or more aircraft in the ATC voice group.

Optionally, the terrestrial relay node comprises: a ground-based receiver configured to receive the ATC voice communication from an ATC voice station associated with the terrestrial relay node, and a ground-based transmitter configured to transmit the received ATC voice communications to the one or more processors.

Optionally, the terrestrial relay node is configured to: receive an analog voice communication from an ATC voice station, convert the analog voice communication from the ATC voice station to an ATC digital voice communication, and transmit the converted digital voice communication to the one or more processors.

Optionally, the terrestrial relay node is configured to: receive an analog voice communication from an ATC voice station, and transmit the analog voice communication from the ATC voice station to the one or more processors.

Optionally, the method comprises: converting the analog voice communication from the ATC voice station to an ATC digital voice communication.

Optionally, the terrestrial relay node is ground-based and is located such that the terrestrial relay lode can communicate with an ATC voice station using a VHF communications link.

Optionally, the terrestrial relay node is communicatively coupled to the one or more processors using a wired physical connection.

Optionally, generating a digital voice communication link with an aircraft of the one or more aircraft comprises: receiving an ATC digital voice communication from a pilot of the one or more pilots, determining an aircraft of the one or more aircraft associated with the pilot; and generating the digital voice communication link with the aircraft associated with the pilot.

Optionally, the method comprises: generating a plurality of copies of the received ATC voice digital voice communication, and transmitting the plurality of copies of the received ATC voice digital communication to each pilot associated with the one or more aircraft in the ATC voice group.

Optionally, the plurality of copies of the received ATC voice digital communication to each pilot associated with the one or more aircraft in the ATC voice group are transmitted using an internet protocol (IP) connection between each pilot and a system configured to manage ATC voice digital communications.

Optionally the method comprises: transmitting the received digital voice communication to the aircraft associated with the pilot using the generated digital voice communication link.

Optionally, the transmitted digital voice communication is configured to be received by the aircraft associated with the pilot.

Optionally, the transmitted digital voice communication is configured to be converted by a converter on the aircraft to an analog voice communication that is transmitted to an ATC voice station.

Optionally, the ATC digital voice communication received from the pilot is based on an analog voice communication transmitted by the pilot.

Optionally, the digital communication link is generated upon receiving the digital voice communication from the pilot.

Optionally, the method comprises: detecting a failure of the digital voice communication link with the aircraft associated with the pilot, and if a failure of the digital voice communication link is detected, transmit the ATC digital voice communication from the pilot of the one or more pilots to a terrestrial relay node.

Optionally, the terrestrial relay node comprises: a ground-based receiver configured to receive the ATC digital voice communication from one or more processors, and a ground-based transmitter configured to transmit the received he ATC digital voice communication to an ATC voice station associated with the terrestrial relay node.

Optionally, the terrestrial relay node is configured to: receive a digital voice communication from the one or more processors, convert the digital voice communication from the one or more processors to an analog voice communication, and transmit the converted digital voice communication to the ATC voice station.

Optionally, the terrestrial relay node is configured to: receive an analog voice communication from the one or more processors, and transmit the analog voice communication from the one or more processors to the ATC voice station.

Optionally, the terrestrial relay node is ground-based and is located such that the terrestrial relay lode can communicate with an ATC voice station using a VHF communications link.

Optionally, the terrestrial relay node is communicatively coupled to the one or more processors using a wired physical connection.

Optionally, the method comprises: detecting a failure of the digital voice communication link with the aircraft associated with the pilot, and if a failure of the digital voice communication link is detected, transmitting the ATC digital voice communication from the pilot of the one or more pilots to a UAS associated with another pilot of the one or more pilots in the same ATC voice group as the pilot.

In one or more examples, a computer-readable storage medium storing one or more programs for facilitating voice communications between an air traffic control voice station and one or more pilots operating one or more aircraft in an air-to-ground communications network, the one or more programs comprising instructions which, when executed by an electronic device with a display and a user input interface, cause the device to: receive one or more flight plans associated with the one or more aircraft, wherein each flight plan comprises timing, location, and altitude information for a flight that is to fly in one or more coverage areas of the air-to-ground communications network, for each aircraft of the one or more aircraft, determine an availability of an RF communications link, and an availability of an air traffic control (ATC) voice communications link based on the received one or more flight plans, generate an RF communications link at a base station of the communications network between the aircraft and the pilot of the one or more pilots associated with the aircraft based on the received one or more flight plans, assign each aircraft of the one or more aircraft to an air traffic control (ATC) voice group of a plurality of ATC voice groups, and generate a digital voice communication link with an aircraft of the one or more aircraft based on the assigned air traffic control (ATC) voice group of the aircraft and the received one or more flight plans.

Optionally, generating a digital voice communication link with an aircraft of the one or more aircraft comprises selecting the aircraft to act as a designated relay for the ATC voice group based on the received one or more flight plans associated with each aircraft that is assigned to the ATC voice group.

Optionally, the device is caused to: receive an ATC digital voice communication from the designated relay aircraft over the digital voice communication link, generate a plurality of copies of the received ATC voice digital voice communication, and transmit the plurality of copies of the received ATC voice digital communication to each pilot associated with the one or more aircraft in the ATC voice group.

Optionally, the ATC digital voice communication is based on an analog voice communication transmitted by an ATC voice station.

Optionally, the analog voice transmission is received by a radio located on the designated relay aircraft for the ATC voice group, and to the ATC digital voice communication using a converter located on the designated relay aircraft.

Optionally, the designated relay aircraft transmits the ATC digital voice communication to the device using the digital voice communication link.

Optionally, the device is caused to: detect a failure of the digital voice communication link from the designated relay aircraft; if a failure of the digital voice communication link is detected, receive an ATC voice communication from a terrestrial relay node, generate a plurality of copies of the received ATC voice communication, and transmit the plurality of copies of the received ATC voice communication to each pilot associated with the one or more aircraft in the ATC voice group.

Optionally, the terrestrial relay node comprises: a ground-based receiver configured to receive the ATC voice communication from an ATC voice station associated with the terrestrial relay node, and a ground-based transmitter configured to transmit the received ATC voice communications to the one or more processors.

Optionally, the terrestrial relay node is configured to: receive an analog voice communication from an ATC voice station, convert the analog voice communication from the ATC voice station to an ATC digital voice communication, and transmit the converted digital voice communication to the one or more processors.

Optionally, the terrestrial relay node is configured to: receive an analog voice communication from an ATC voice station, and transmit the analog voice communication from the ATC voice station to the one or more processors.

Optionally, the device is caused to: convert the analog voice communication from the ATC voice station to an ATC digital voice communication.

Optionally, the terrestrial relay node is ground-based and is located such that the terrestrial relay lode can communicate with an ATC voice station using a VHF communications link.

Optionally, the terrestrial relay node is communicatively coupled to the one or more processors using a wired physical connection.

Optionally, generating a digital voice communication link with an aircraft of the one or more aircraft comprises: receiving an ATC digital voice communication from a pilot of the one or more pilots, determining an aircraft of the one or more aircraft associated with the pilot, and generating the digital voice communication link with the aircraft associated with the pilot.

Optionally, the one or processors are caused to: generate a plurality of copies of the received ATC voice digital voice communication, and transmit the plurality of copies of the received ATC voice digital communication to each pilot associated with the one or more aircraft in the ATC voice group.

Optionally, the plurality of copies of the received ATC voice digital communication to each pilot associated with the one or more aircraft in the ATC voice group are transmitted using an internet protocol (IP) connection between each pilot and the device.

Optionally, the one or more processors are caused to: transmit the received digital voice communication to the aircraft associated with the pilot using the generated digital voice communication link.

Optionally, the transmitted digital voice communication is configured to be received by the aircraft associated with the pilot.

Optionally, the transmitted digital voice communication is configured to be converted by a converter on the aircraft to an analog voice communication that is transmitted to an ATC voice station.

Optionally, the ATC digital voice communication received from the pilot is based on an analog voice communication transmitted by the pilot.

BRIEF DESCRIPTION OF THE FIGURES

The invention will now be described, by way of example only, with reference to the accompanying drawings, in which.

DETAILED DESCRIPTION

Figure 1:
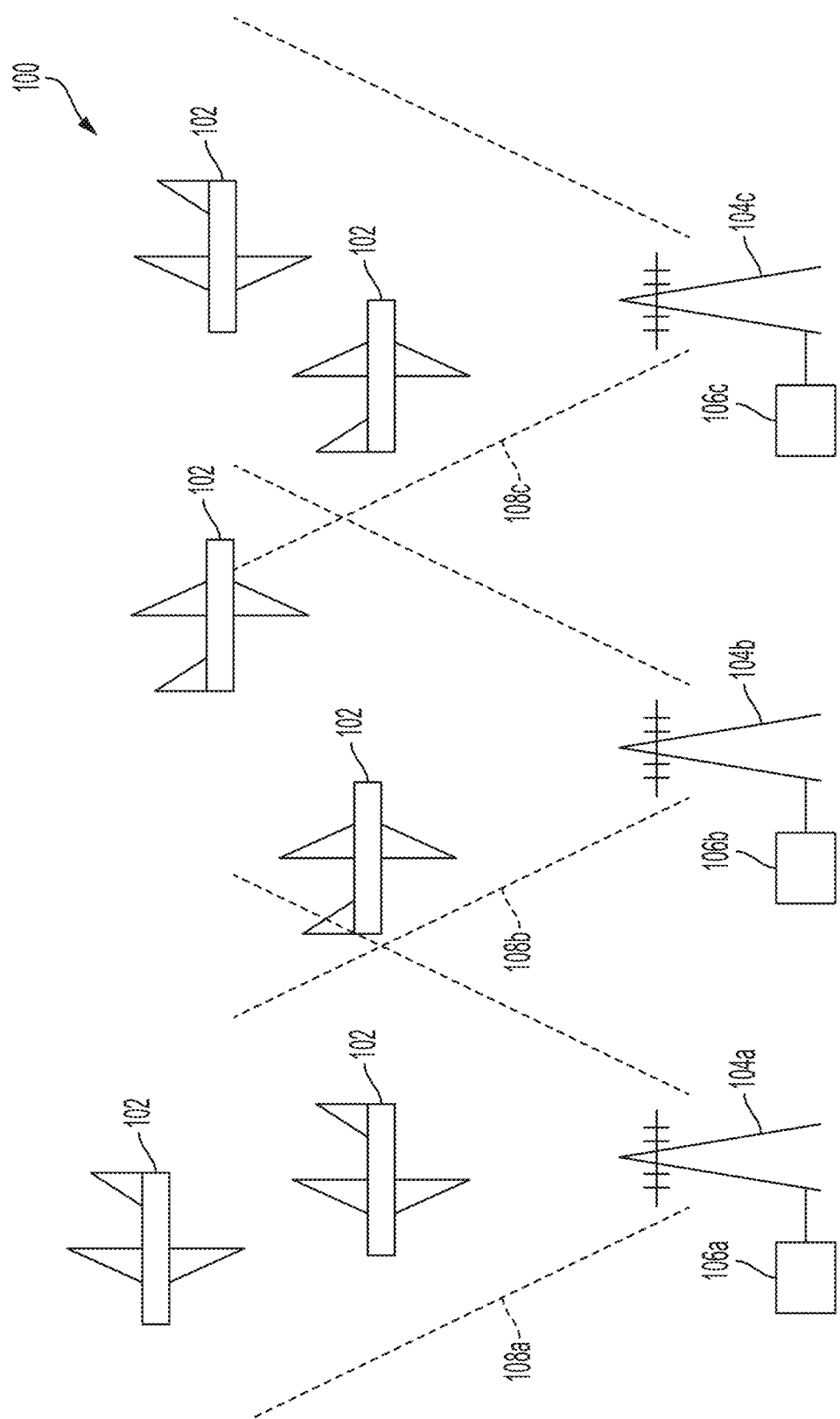
FIG. 1 illustrates an exemplary aviation network according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for transmitting and receiving air traffic control voice audio. In one or more examples of the disclosure, upon receipt of a flight plan and completed reservation and assignment of spectrum resources by a spectrum management system, the spectrum management system may relay communications between UAS operators and ATC through a designated relay aircraft. Additionally, or alternatively, the spectrum management system may relay communications between UAS operators and ATC through a terrestrial relay node.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an exemplary aviation network according to examples of the disclosure. The example of FIG. 1 illustrates an exemplary communications network 100 that can be configured to provide communications between one or more ground base stations 104a-c and one or more aircraft 102 in-flight or that are on the ground. Each of the ground base stations 104a-c include one or more antennas configured to transmit communications from the ground to the one or more aircraft 102 (which are either in-flight or on the ground). In one or more examples, each ground base station 104a-c can be configured to provide transmissions within a coverage area 108a-c. For example, ground base station 104a can be configured to transmit radio frequency (RF) spectrum radio signals over geographic coverage area 108a. Ground base station 104b can be configured to transmit RF spectrum radio signals over geographic coverage area 108b, and ground base station 104c can be configured to transmit RF spectrum radio signals over geographic coverage area 108c. In one or more examples, geographic coverage areas 108a-c can be three-dimensional areas that not only cover a certain range of latitude and longitude, but also provide coverage to areas from the ground up until a maximum serviceable altitude.

In one or more examples, each aircraft 102 can be handed over from one ground base station to the next during the duration of its flight. For instance, at the beginning of a flight, ground base station 104a can be responsible for providing a communications channel between an operator on the ground and the aircraft while the aircraft 102 is within the coverage area 108a. If during the flight, the aircraft transits out of the coverage area 108a into coverage area 108b, then responsibility for providing the communications channel can transition from ground base station 104a to ground station 104b. If during the flight, the aircraft 102 transits out of coverage area 108b into coverage area 108c, then responsibility for providing the communications channel can transition from ground base station 104b to ground station 104*c*. In this way, the communications network 100 can be configured to ensure that an aircraft has an established communications channel with at least one ground base station at any point along its flight plan, so long as the flight plan passes through at least one coverage area at any point during its flight.

In one or more examples, each base station 104*a-c* can be communicatively coupled to a base station controller 106*a-c* respectively. Thus, in one or more examples, ground base station 104*a* can be communicatively coupled to base station controller 106*a*, ground base station 104*b* can be communicatively coupled to base station controller 106*b*, and ground base station 104*c* can be communicatively coupled to base station controller 106*c*. As described in further detail below, each base station controller can be configured to implement an RF based communications channel between a ground operator and an aircraft 102 when the aircraft is transiting through the coverage area 108*a-c* that corresponds to the base station that the controller is configured to operate. In one or more examples, implementing an RF based communications channel can include modulating signals transmitted by the operator to a RF spectrum frequency assigned to the aircraft 102, applying an appropriate modulation scheme to the transmitted signals, and applying any other physical layer communications protocols such as error correction codes.

In one or more examples, the goal of the communications network 100 can be to provide any given aircraft 102 operating within the network with a continuous and reliable RF spectrum channel throughout the duration of its flight. In one or more examples, providing a continuous and reliable RF spectrum to an aircraft can include providing a single RF spectrum channel (i.e., slot) to an aircraft that it can reliably use throughout the duration of its flight to communicate with the ground. In one or more examples, each aircraft in a given airspace can communicate with the ground using a dedicated RF spectrum channel (i.e., a frequency range in the RF spectrum that is unique to the aircraft and can be only used by that individual aircraft to transmit and receive communications from the ground). In order to facilitate efficient flight operations, in one or more examples, each ground base station 104*a-c* coupled to its corresponding base station controller 106*a-c* can be configured to ensure that each aircraft in its coverage area 108*a-c* is able to communicate with the ground using communications transmitted in the RF spectrum channel assigned to that aircraft.

In one or more examples, each ground base station 104*a-c* can include one or more antennas that are mounted to the base station and are configured to transmit signals from one or more ground operators (i.e., pilots) to one or more airborne radios mounted on the aircraft 102. In one or more examples, and as described in further detail below, the one or more antennas can be implemented as an array of computer-controlled antennas that can be electronically "steered" to point in different directions depending on the location of the aircraft in the network 100. In one or more examples, the antenna can be implemented as a phased array antenna, which allows for a signal to be directed in a particular direction without having to physically move the antennas. By pointing the antenna in the direction of the target (i.e., the airborne radio that will transmit to and receive data from the antenna), the antenna is able to maximize the signal to noise ratio of the communications link between the antenna and the airborne radio thereby ensuring a stable communications link between the ground and the airborne radio.

Figure 2:
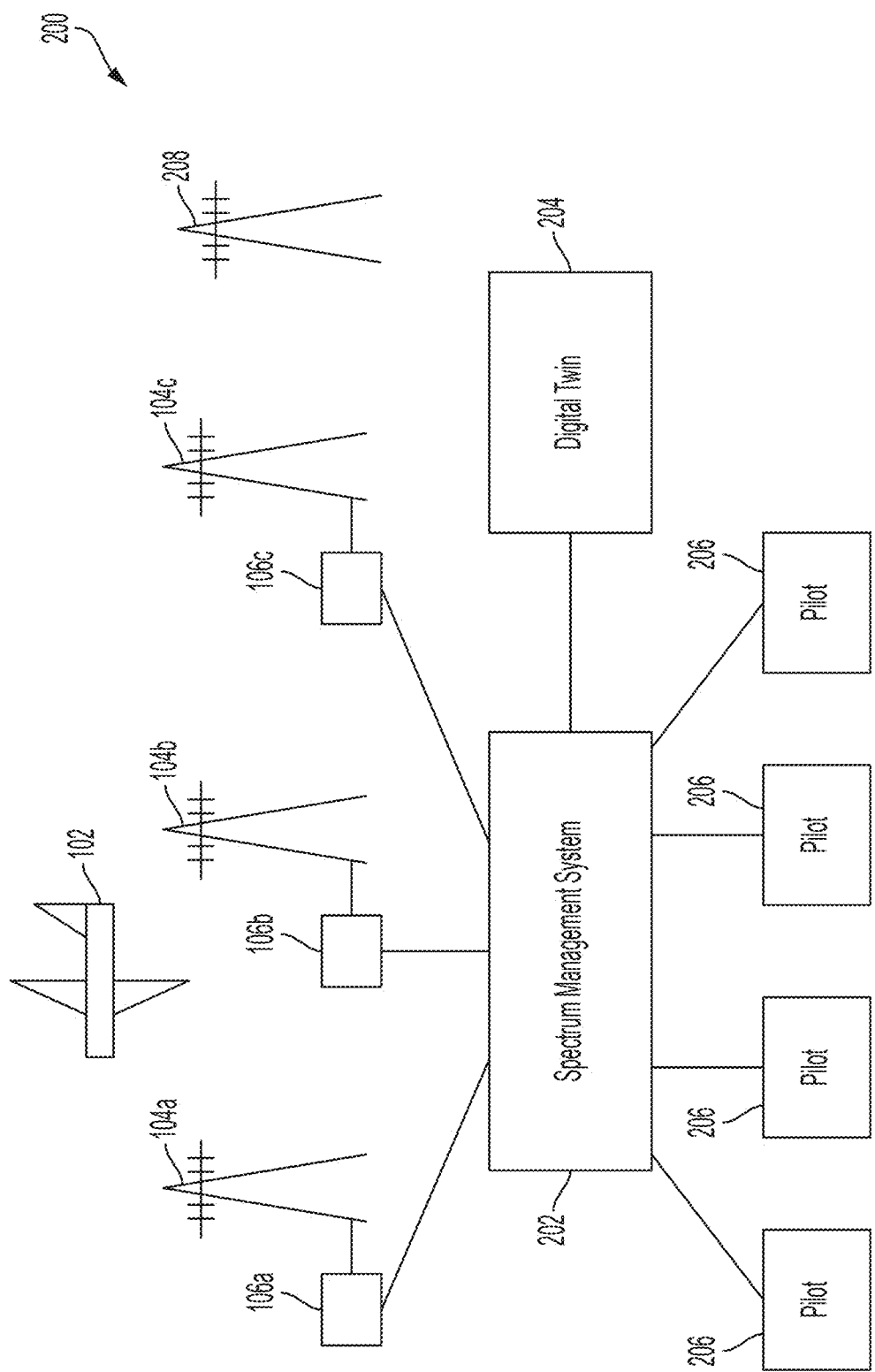
FIG. 2 illustrates an exemplary system for RF spectrum management of aviation communication networks according to examples of the disclosure.

FIG. 2 illustrates an exemplary system for RF spectrum management of aviation communication networks according to examples of the disclosure. In one or more examples of the disclosure, the communications network 200 of FIG. 2 can include the same components (i.e., aircraft 102, ground base stations 104*a-c*, and base station controller 106*a-c*) as the communications network 100 described above with respect to FIG. 1, but can also include one or more spectrum management system components (described in further detail below) that can manage the process of allocating RF spectrum channels to aircraft 102 in the network 200.

In one or more examples of the disclosure, one or more pilots/operators 206 can be connected to the network 200 in order to transmit data (such as command and control data) to the one or more aircraft 102. Each of the pilots 206 can be communicatively coupled to the network 200 through a spectrum management system 202 that can be configured to allocate RF spectrum channels to each of the aircraft 202 being controlled by the pilots 206. In one or more examples, the spectrum management system 202 can be configured to facilitate a communications link between each pilot 206 and their corresponding aircraft 102 by establishing an RF communications link using a specified RF spectrum channel allocated to each aircraft.

In one or more examples of the disclosure, the spectrum management system 202 can be configured to manage each active communication link (i.e., operation link, in conjunction with a ground-based base station) between an aircraft 102 and a pilot/operator 206. Thus, in one or more examples, if the spectrum management system 202 determines that a given communications link has been compromised or had degraded, the spectrum management system 202 can take action to adjust the communications link to mitigate the issue. For instance, in one or more examples, if a given RF spectrum channel being used by an aircraft 102 is no longer performing satisfactorily or to required specifications, the spectrum channel management system 202 can change the RF spectrum channel (described in detail below) to an alternative available channel in real-time to ensure that each aircraft maintains a reliable RF communications link. In one or more examples, if the pilot deviates from their advertised flight plan (for example by flying longer than anticipated) the spectrum management system 202 can be configured to take action (for instance by switching the RF channel) to ensure that any interruptions to the communications channel are mitigated.

In one or more examples of the disclosure, in addition to actively managing communication channels, the spectrum management system 202 can be configured to allocate and reserve one or more RF channels for a given flight to be used during the duration of the flight. As described in further detail below, the spectrum management system 202 can receive a flight plan and based on the filed flight plan as well as other factors (such as the availability of the antenna) can allocate an RF channel to each flight in a deterministic manner that takes into account potential interference that may be encountered during the flight.

In one or more examples, the spectrum allocation process described above can be implemented by the spectrum management system 202, and/or can be processed in one or more separate components collectively referred to herein as a "digital twin." Due to the large volume of information and the potential for spectrum and/or traffic channel requests by tens of thousands of end users in a given airspace, a digital twin of the spectrum management system can be used to perform the required analysis without impacting the operational system. In one or more examples, and as illustrated in the example of FIG. 2, the digital twin 204 can be implemented separately from the spectrum management system 202 so as to reduce the processing load of the spectrum management system 202, thus leaving it free to perform the real-time operations associated with managing the active communications channels of aircraft transiting the airspace managed by the spectrum management system 202. Alternatively, the digital twin 204 can also be implemented as part of the spectrum management system such that both the real-time management of air communication links, and flight planning are performed by the same component.

In one or more examples, the digital twin 204 can be configured to receive one or more requests from the pilots 206 for spectrum to use during a given flight plan. The digital twin, using the flight plan provided by the pilot as well as other factors (described below) can determine what RF spectrum channels to allocate to an aircraft when its flight commences. Once requests are confirmed in the digital twin 204, execution and assignment of the communications channel on the operational spectrum management system 202 can be performed.

As described above, the spectrum management system 202 and the digital twin 204 can coordinate the RF spectrum needs of multiple aircraft in a given communications network so as to ensure that each individual aircraft can have access to a reliable and continuous communications channel with the ground during the entirety of its flight. In one or more examples, the spectrum management system 202 and the digital twin 204 can work in tandem to allocate and reserve RF spectrum channels for individual aircraft, and as described below, can monitor each individual communications link in-flight to ensure that the communications link is operating to its requirement.

Selecting an RF channel to allocate to a given flight can involve analyzing multiple variables to ensure that the selected channel will service the needs of an aircraft throughout the duration of its flight. In one or more examples, the spectrum management system 202 and the digital twin can analyze several variables such as the available spectrum resources, radio link throughput and performance requirements, location (including elevation), time-period as well as the radio frequency environment to assign a non-contended resource between the pilot and the aircraft. In one or more examples, the variables that influence channel selection can be populated by several internal and external components to the spectrum management system 202 that work together to match an aircraft to one or more RF channels for use during a flight as described below.

In one or more examples, each pilot (i.e., operator) in the communications network can interface with the communications network before and during their flight via the spectrum management system 202 and the digital twin 204. Before the flight, and as described below, the pilot can interface with the spectrum management system and digital twin to receive an RF spectrum channel allocation for use during their flight based on their filed flight plan and other variables. During the flight, the spectrum management system 202 can provision the allocated RF spectrum channel to both the aircraft and the pilot to establish a continuous communications link and the spectrum management system can monitor the link during the flight to make sure it is performing within specification.

In one or more examples of the disclosure, the network 200 can include one or more base stations that may or may not be connected such as to a point-to-point communication link to the spectrum management system 202. In one or more examples, a service provider who provides and maintains access to the spectrum management system 202 may not provide coverage to every desired geographic location. In one or more examples, in areas where a pilot may want to operate a flight but that does not fall within a coverage area of an existing base station, the service provider can provide the pilot with a temporary or portable base station 208. In one or more examples, the temporary/portable base station may not have a connection with the spectrum management system 202 and thus cannot receive/transmit information to the spectrum management system for the purposes of provisioning RF channels to aircraft. In one or more examples, these non-connected base stations will have operation plans submitted, into the spectrum management system and digital twin to be coordinated and geofenced for interference and coverage.

In one or more examples, the temporary/portable base station 208 can be used to setup point-to-point and multi-point links between the temporary/portable base station 208 and one or more aircrafts radios for flight operation. In one or more examples of the disclosure, the operator of a temporary/portable base station 208 can inform the service provider a "concept of operation" of the base station 208 that describes the number of aircraft, the times they will fly and the spectrum they will use to communicate with the aircraft. While the spectrum monitoring system 202 may not send real-time information to the temporary/portable base station 208, the spectrum management system 202 can use the concept of operation of the temporary/portable base station to update the geofences (described in detail below) of the base stations 106a-c that are connected to the network and can work to ensure that flights that are flying within its network 200 do not cause interference with the flight operations of the temporary/portable base station 208. In one or more examples, the spectrum management system 202 can notify the operators of flights transiting the network 200 about the physical limitations to their operations caused by the temporary/portable base station 208 and can factor in the operations of the temporary/portable base station 208 when making RF spectrum slot allocations. In this way, while the spectrum management system 202 may not coordinate the operations of the temporary/portable base station 208, it can work to protect its own network (i.e., the base stations that are connected to the spectrum management system) from the operations of the temporary/portable base station's point-to-point operations.

Figure 3:
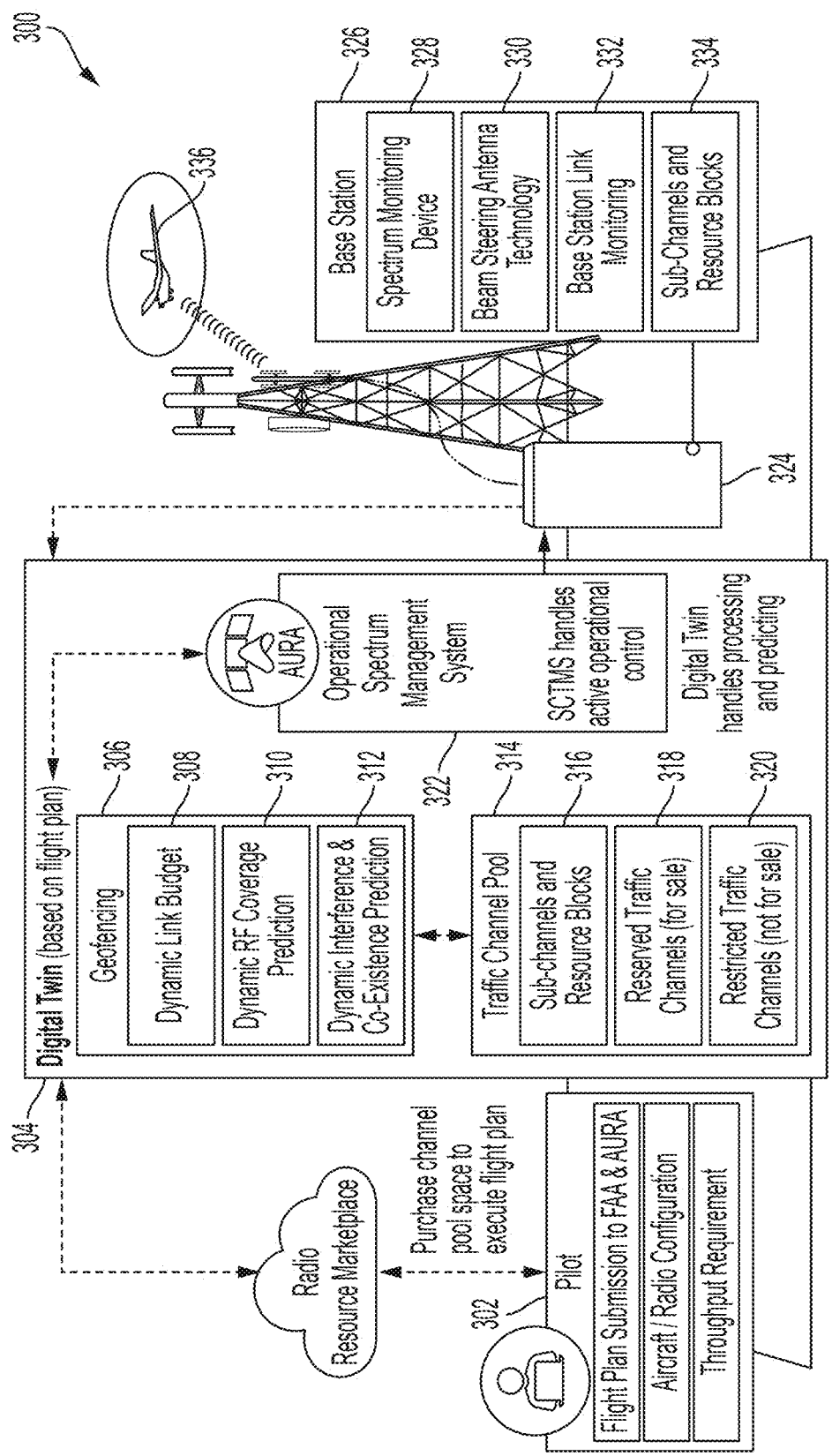
FIG. 3 illustrates an exemplary system for RF spectrum allocation and management according to examples of the disclosure.

FIG. 3 illustrates an exemplary system for RF spectrum allocation and management according to examples of the disclosure. In one or more examples, the system 300 can represent a single link of a communications network shown in FIGS. 1 and 2, and includes the components that manage the link between a pilot 302 and an aircraft 336. In one or more examples of the disclosure, the planning, creation, and operation of the link between the pilot 302 and the aircraft 336 can begin with the pilot 302 submitting information about their proposed flight to the digital twin 304. In one or more examples, and as shown in FIG. 3, the information transmitted by the pilot 302 to the digital twin 304 can include a flight plan, an aircraft/radio configuration, and a throughput requirement.

In one or more examples, the flight plan (which can also be referred to as an operations plan) submitted by the pilot 302 can include flight mission details such as the intended timing, altitude, location, and speed of the aircraft during a proposed flight. In one or more examples, the pilot 302 can submit the flight plan to both a regulatory body (such as the Federal Aviation Administration (FAA)) for approval and additionally send the flight plan to the spectrum management system via the digital twin 304 for the purpose of obtaining one or RF spectrum channels for use during the proposed flight. In addition to the flight plan, the pilot 302 can send additional information to the digital twin 304 that the digital twin can use to select and allocate a RF spectrum channel to the user. For instance, in one or more examples, the pilot 304 can transmit the configuration of the aircraft or radio so as to inform the digital twin 304 as to the type of radio that the pilot will be communicating with during the flight. Knowledge of the radio configuration can allow for the digital twin 304 to not only understand the spectrum needs of the aircraft but can also allow for the digital twin to determine and predict other necessary information about the communications channel such as the modulation scheme and the forward error correction code that will be active in-flight.

In one or more examples of the disclosure, the pilot 302 can also transmit a throughput requirement to the digital twin 304. In one or more examples, the throughput requirement can represent the amount of data that is needed to be sent and received over the communications link. In one or more examples, the throughput can either be specified by the pilot 302 or can be derived based on the aircraft/radio configuration submitted by the pilot. For instance, in one or more examples, a particular aircraft (such as a UAV) may need a certain throughput of data for the channel to properly operate its autopilot features and thus by knowing the aircraft type, the system can derive the throughput requirements for that flight. As described in detail below, the throughput requirement can be used to determine the total amount of bandwidth for an RF spectrum channel and can thus inform the selection of a channel or channels that has an effective bandwidth to accommodate the throughput requirements of the flight.

As described above, the digital twin 304 can use the flight plan and other information transmitted to it by the pilot 302 as well as other information to select one or more RF spectrum channels for use by the pilot 302 during their flight. In one or more examples, the digital twin 304 can access a traffic channel pool 314 to determine the availability of RF spectrum channels to service a given flight. In one or more examples, the traffic channel pool 314 can represent all of the RF spectrum channels that could possibly be used to service a given flight. However, since there can be multiple aircraft in the network at any given time, and the need to reserve certain channels for emergency purposes (described in detail below), not every channel in the traffic channel pool 314 may be available for use by a particular aircraft during the times and locations required by a flight based on its flight plan.

In one or more examples, the digital twin 304 can select a channel or channels from the traffic channel pool 314, which as described above can include available sub-channels 316, reserved channels 318, and restricted traffic channels 320.

In order to allocate an RF channel to an aircraft, the digital twin 304, in one or more examples, can first determine if RF coverage is available for the aircraft during the entirety of its flight. To do so, in one or more examples, the digital twin 304 of the spectrum management system can "geofence" the coverage areas of each of the ground based stations in the network as shown at 306. In one or more examples, a "geofence" 306 can refer to a zone within a coverage area in which there is sufficient RF availability for flight traffic. In one or more examples, when a pilot 302 submits a flight plan, the system can query the geofences 306 to make sure there is RF availability throughout the path of the plan and at all altitudes expressed in the flight plan. In one or more examples of the disclosure, geofences can be shared with the pilot/operator of a flight and can be programmed into the auto-pilot of an aerial vehicle for use during a flight.

In one or more examples, a geofence can be created using a dynamic link budget 308 that is maintained by the digital twin 304. In one or more examples, each geofence 306 can have its own dynamic link budget 308. The dynamic link budget 308 can determine what the RF availability of a given geofence is at any particular moment in time, and can even predict RF availability for a given geofence in the future based on various parameters. In one or more examples, the dynamic link budget 308 can include such parameters as antenna gain, RF losses, receiver sensitivity, power, frequency, spectrum bandwidth, traffic channel size/quantities (i.e., sub-channels, resource blocks), quality of service (QOS) requirements, modulation, spectrum monitoring system results (described in further detail below) and the location of any known co-channel interferers. The dynamic link budget 308 can also include an RF safety margin to ensure a reliable communications signal in the geofence 306. In one or more examples, the operational spectrum management system 322 (described in detail below) can maintain a real-time version of the link budget that changes based on changing conditions in the RF environment. In one or more examples, the digital twin 304 can maintain a model of the link budget, and that dynamic link budget 308 can be used to predict RF conditions at a future time based on the times implicated by a given flight path. In one or more examples, the dynamic link budgets for each geofence can be validated using measurements of RF spectrum activity at each of the base stations in the area to ensure that the dynamic link budgets include the most up-to-date information and accurately reflect the RF environments that the dynamic link budgets are meant to model. In one or more examples, each geofence can be configured to predict coverage based upon components of the flight plans presented to the spectrum management system, the spectrum monitoring systems employed at each base station, the capabilities of the beam/null forming antennas at each base stations, as well as the known locations of other airborne radios. In one or more examples, the actual performance of radio links created at the base stations can be monitored and the information sent to the spectrum managements system for validation and modification of the geofences.

In one or more examples, and as part of the process of allocating RF spectrum channels to an aircraft, the digital twin 304 can cross reference the dynamic link budget with a calibrated RF coverage prediction tool 310. In one or more examples, the RF coverage prediction tool 310 uses appropriate RF prediction models, morphology, topology, antenna pattern characteristics, and antenna elevations to create the dynamic geofence coverage area based upon the remote radio configuration and user requirements. In one or more examples, the RF coverage prediction tool 310 can be used to generate a dynamic link budget for each geofence coverage area that a flight will transit based on its filed flight plan.

In one or more examples of the disclosure, the digital twin 304 can also be configured to determine whether the beam/null steering antenna can simultaneously provide the required lobes and nulls to the intended targets in a manner that will not conflict with one another. As described above, based on the flight plans submitted to the digital twin, the digital twin can have a priori knowledge of potential channel interference between aircraft. For instance, at a particular base station, an airborne radio transiting the airspace at the base station may experience channel interference from the communications being transmitted by an aircraft that it is transiting an adjacent coverage area that is simultaneously communicating with its own respective base station. In one or more examples, and as described above, the beam/null steering antenna can project a lobe (i.e., beam) at the desired signal (i.e., the airborne radio in its coverage area), and point a null signal towards the other aircraft in the adjacent coverage area so as to minimize the interference caused by that aircraft. However, as described above, the antenna can be required to coordinate its elements (i.e., the transmit and receive elements) so that the signals being received and transmitted with one another don't interfere with one another for instance by crossing beams and therefore creating conflicts within the antenna. As a single beam/null steering antenna can be operating numerous communications channels at once, the beam/null steering antenna must make sure that it operates those communications links in a manner that does not cause conflicts (i.e., the beams and nulls don't interfere with one another).

In one or more examples, the digital twin 304 as part of the process of ensuring that a received flight plan has RF availability over the duration of its flight, can simulate and determine if the required lobes and nulls and their directions will cause a conflict in the antenna as described above. If an antenna conflict is detected, the digital twin 304 can alert the operator that the flight plan needs to be adjusted because of the conflict.

While the process described above can ensure that a pilot has continuous operational communication with the UAS they are piloting (able to transmit commands to the UAS, and receive flight information from the drone), the pilot may also be required to keep in contact with ATC during the flight so that the movements of the UAS can be coordinated with other manned and unmanned aircraft to avoid collisions and otherwise ensure that the UAS does not interfere with other aircraft or airspace operations. Thus, in order to ensure that aircraft and pilots in the aviation network described above are able to communicate with ATC during a flight, the aviation network described above may be required to be compatible with the existing infrastructure provisioned for manned flights to communicate with ATC during flight operations.

In one or more examples, manned flights communicate with air traffic controllers (located at the ground) via the use of very high frequency (VHF) communications. Specifically, the frequency range of 108 to 137 MHz has been reserved for use by civil aviation to allow for air traffic controllers to communicate with aircraft that are in flight. VHF communications, while providing clear communications to aircraft traveling at low to high altitudes, require line of sight between the source of the transmission and the receiver of a transmission. Due to the transmission range of VHF communications and its need for line of sight with the aircraft, ATC communications are administered in geographic zones, such that an aircraft in flight will communicate with an air traffic controller that its closest to its position, and will be handed off to another ATC controller when that controller becomes closer or within range of the aircraft. In one or more examples, a single air traffic controller can communicate with multiple aircraft flying in its assigned geographic region using a pre-defined frequency that each aircraft/pilot in the airspace are instructed to tune to, when they are flying in the geographic zone administered by the air traffic controller.

The existing infrastructure that ATC uses to communicate with manned aircraft can present unique challenges for UAS and their pilots. For instance, unlike manned aircraft where a pilot is physically located in the aircraft that is flying, a UAS pilot may not be physically located in the same geographic area as the aircraft. Thus, an ATC controller in the geographic area being transited by a UAS may not be able to directly contact the pilot using the VHF channel assigned to the aircraft, since the pilot may not be located in the geographic coverage area of the air traffic controller. Furthermore, in order to coordinate the airspace, all of the pilots in a given geographic zone must be able to listen to all the communications between ATC and the pilots in the zone, and must also ensure that their communications with ATC can be heard by all of the other pilots in the zone.

In one or more examples, a UAS pilot's communications with ATC may be separate from the pilot's operational communications with the aircraft. As described above, a spectrum management system can be employed to provide the pilot with a dedicated operational communications link with its aircraft during its flight. The operational communications link is not shared by other pilots and is a dedicated link that ensures that the pilot can provide commands to the aircraft they are piloting, and receive operational information from the aircraft during the course of a flight. Thus, in one or more examples, a UAS pilot may be required to use two separate communications channels during a flight: one to maintain operational communications with the aircraft being piloted, and another with the air traffic controller that is assigned to the geographic zone that their aircraft is transiting.

In one or more examples, and referring back to FIG. 1, a given base station 104 may be responsible for administering the operational communications links for multiple aircraft 102 simultaneously. Thus, the base station through the use of a spectrum management system as described above, may need to ensure that none of the individual operational links it is maintaining at a given time suffer from spectral interference. If each aircraft transiting the base station 104 air space must also be required to transmit and receive ATC voice communications, the risk that that ATC communications could interfere with the operational communications link could substantially increase. Thus, as will be described below in further detail, a digital aviation network can employ an ATC voice processor that is configured to administer ATC voice communications between pilots and an air traffic controller in a manner that ensure a pilot is able to receive transmissions from the air traffic controller of the geographic zone that its aircraft is assigned to in a manner that also minimizes the risk of spectral interference with the operational communications links managed by the spectral management system. In one or more examples, and as described in further detail below, the ATC voice process (with input from the spectral management system described above with respect to FIGS. 2-3) can be used to administer an ATC voice communications system that uses the flight plans provided to the spectrum management system to coordinate ATC voice communications in a manner that ensure pilot connectivity with the air traffic controller that is providing oversight of their aircraft, while also ensuring that the ATC voice communications minimize the potential for spectral interference with the operational communication links also being administered by the spectrum management system.

Figure 4:
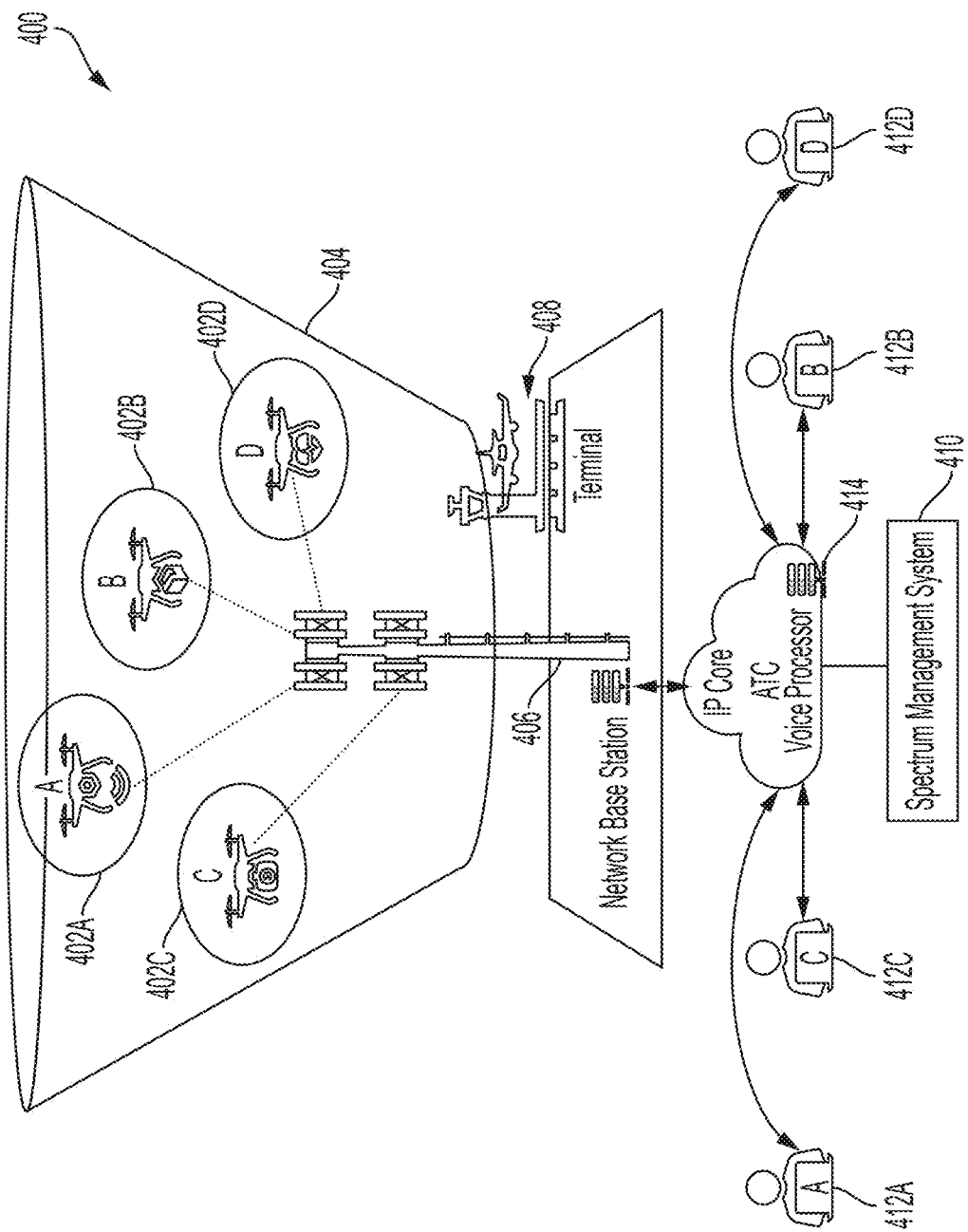
FIG. 4 illustrates an exemplary system for facilitating communications between unmanned aircraft system operators and ATC according to one or more examples of the disclosure.

FIG. 4 illustrates an exemplary system for facilitating communications between unmanned aircraft system operators and ATC according to one or more examples of the disclosure. In one or more examples, the system 400 can be configured to facilitate voice communications between UAS pilots 412A-412D and one or more ATC voice stations 408. As discussed above, since the ATC voice stations 408 utilize VHF communications, which require line of sight to transmit messages, in one or more examples, the system 400 can utilize one more UAS 402A-D to relay voice communications between the ATC voice station 408 and the one or more pilots 412A-D. In the example of FIG. 4, each UAS 402A-D can correspond to the plots 402A-D respectively. In other words, pilot 412A can be piloting UAS 402A, and so on and so forth.

In one or more examples, each pilot 412A-D can be communicatively coupled to an ATC voice processor 414. In one or more examples, the ATC voice processor (AVP) can act as a server in the aviation network (such as the one described above with respect to FIG. 2), that performs various functions associated with facilitating ATC voice communications between pilots and ATC voice stations 408. For instance, in one or more examples, AVP 414 can be configured to identify all UAS and pilots connected to the aviation network requiring ATC voice services, manage voice traffic queues (i.e., ensuring that communications are processed in the order that they are received, and do not interfere with another), copying and delivering messages to all required parties (i.e., multi-cast), act as a multi-way switch for voice traffic, managing the voice traffic to properly assigned UAS along the aviation network radio link (described in further detail below) defined by a base station resource manager and the spectrum management system 410. In one or more examples, AVP 414 can be communicatively connected to the pilots 412A-D, the base station 406, and the spectrum management system 410 (described above with respect to FIG. 2), to coordinate the passing of messages between each of the components to process and disseminate voice traffic between the ATC voice station 408 and the pilots 412A-D.

In one or more examples, and as described above, the AVP 414 can be communicatively coupled to a spectrum management system 410 similar to the spectrum management systems described above with respect to FIGS. 2-3. In one or more examples, and as described in further detail below, the spectrum management system 410 can be configured to receive one or more flight plans submitted by one or more users. Using the submitted flight plan, the spectrum management system 410 can not only geofence the aviation network (as described above) but can also geofence the ATC voice network (i.e., which ATC Voice Stations 408 will be implicated by a particular flight plan) to determine the availability of spectrum resources throughout the duration of the flight indicated by the flight plan. Thus, in one or more examples, the spectrum management system 410 can predict what ATC voice stations 408 will be used by the flight based on its submitted flight plans and based on knowledge of ATC Voice station locations and frequencies. In one or more examples, the spectrum management system 410 can geofence the ATC Voice station coverage areas (as illustrated at 404 of FIG. 4) to make various determinations such as determining which aircraft will have the strongest communications link with a particular ATC voice station at any given moment. As will be discussed in further detail below, the spectrum management system 410 can provide this information to the AVP 414 which can use the information to administer voice traffic between the pilots 412A-D and the one or more ATC voice stations 408.

In one or more examples, and as described above, the AVP 414 can also be communicatively coupled to one or more base stations 406 of the aviation network. In one or more examples, the AVP 414 can pass one or more messages to the aircraft 402A-402D flying in the network providing them with instructions on actions to take pertaining to relaying voice communications between the pilots 412A-D and one or more ATC voice stations 408. As will be described in further detail below, each base station of the one or more base stations 406 can operate and maintain one or more voice traffic resources that can be used to transmit voice communications between the one or more aircraft 402A-402D in the network and the base station 406. For instance, in one or more examples, the voice traffic resources can include a dedicated RF channel, or a time slot within a specific RF channel (that can be time multiplexed with operational communications link) or a sub-channel of a RF channel. In one or more examples, the radio voice channel maintained by the network base station can be in addition to the dedicated operational communications channels that are allocated to each UAS 402A-D by the spectrum management system described above with respect to FIGS. 1-3 that is used to allow for a pilot to control the UAS they are piloting as well as receiving information about the operational status of the UAS while it is in flight.

The system described above with respect to FIG. 4 can be used to facilitate communications with pilots and ATC voice stations including communications from an ATC voice station to one or more pilots, and from the one or more pilots to an ATC voice station. The spectral requirements engendered by the operation a plurality of dedicated radio links between pilots and the UAS they are piloting can present challenges with facilitating ATC voice communications. As described above, in conventional manned aircraft, a pilot is located in the plane they are piloting, and thus can communicate with ATC using a radio located in the plane they are piloting, and communicate with an ATC voice station within line of sight of their aircraft. However, in the case of unmanned aircraft (i.e., UAS), the pilot may not be located in the same location as the UAS they are piloting. For instance, a UAS flight from Seattle to Los Angeles may be piloted by a pilot located in Miami. Thus, even though the ATC voice station assigned to the UAS may have line of sight with the UAS, the ATC voice station may not have line of sight with the pilot of the UAS, and thus the UAS pilot may not be able to directly communicate with the ATC voice station, and instead in one or more examples, use their UAS (which does have line of sight with the ATC voice station) as relay to pass voice messages between their pilot and an ATC voice station. Thus, in one more examples, if an ATC voice station sends a voice message on the frequency assigned to the voice station, each and every UAS that is assigned to the voice station (and is thus tuned to the frequency assigned to the voice station) can receive the message, and then relay the message back to the pilot using the dedicated radio communications link provided by the spectrum management system to facilitate operational communications between the pilot and the UAS.

However, such a system, in which each UAS acts as a relay between its pilot and its assigned ATC voice station can present challenges as well. For instance, if each UAS uses its operational communications links assigned to it by the spectrum management system to relay voice communications, the channel may not have adequate bandwidth to handle both the voice traffic and the operational control data on the single channel, thus causing interruption to operational control of the UAS by the pilot. Alternatively, in one or more examples, each UAS on the network could be provided with its own separate voice channel (i.e., at a dedicated frequency), however such a system could also result spectral congestion as the numerous channels needed to maintain such a system could cause interference with the dedicated operational communication links of the UAS in the network.

Thus, in one or more examples, and as described in further detail below, rather than using each UAS in the network as relay to pass voice messages between an ATC voice station the pilot, a single UAS in an aviation network can be used as a relay to transmit messages between an ATC voice station and the pilots on the ground. In one or more examples, and as described in further detail below, all of the UAS on the aviation network and associated with a particular ATC voice station at any given moment can be determined to form an ATC voice group. In one or more examples, and as further described in detail below, the spectrum management system can use the flight plans submitted by each pilot of a UAS to determine which aircraft of the ATC voice group should be designated as the relay aircraft. Once the relay is selected, in one or more examples, the relay can be used to relay voice message from the ATC voice station associated with the ATC voice group Referring back to the example of FIG. 4, in one or more examples, an ATC voice station 408 can have a coverage area 404 that is defined by a geographic area that can maintain line of sight VHF communications with the ATC voice station. In one or more examples, the coverage are 404 can be defined by a regulatory body. For instance, in the United States, the FAA maintains Air Route Traffic Control Centers (ARTCC), which are a plurality of ATC voice stations geographically spread through the United States, with each voice station servicing a bounded geographic area such that any flight within the area is assigned to communicate with the voice station pertaining to its current location in the United States. Thus, in one or more examples, the coverage area 404 of FIG. 4 can represent the geographic area that is covered by a particular ATC voice station 408. In the example of FIG. 4, the ATC voice station 408 can be a terminal ATC voice station (i.e., a voice station located at an airport, such as within the control tower of the airport).

In one or more examples, the ATC voice station 408 can have one or more UAS 402A-D flying through its coverage 404. In one or more examples, each of the UAS flying in coverage area 404 can be assigned by an ATC controller who, in one or more examples, instructs the pilot to switch the frequency of their ATC communications to the frequency corresponding to the ATC voice station assigned to the flight based on its current position. In one or more examples, the ATC voice processor 414 can track which flights in the network are assigned to a particular voice station. In one or more examples, in addition to being assigned to a ATC voice station such as ATC voice station 408, the aircraft in the coverage area 404 can also be assigned to a base station such as base station 406. In one or more examples, the base station 406 can be configured in substantially the same manner as the base stations of an aviation network described above with respect to FIGS. 1-3 above. In one or more examples, the plurality of UAS associated with an ATC voice station coverage area 404, can be assigned to one or more base stations, with each UAS being only assigned to a single base station. In other words, the coverage area 404 and the coverage area of a base station may not be the same, such that some UAS in the ATC voice station coverage area 404 can be assigned to a first base station, while other aircraft who are also part of the coverage area 404 may be a assigned to a different base station. In one or more examples, all of the UAS assigned to a particular coverage area can be identified by the ATC voice processor 414 and categorized as belonging to an ATC voice group. Thus, in one or more examples, the ATC voice processor 410 of the digital aviation network can maintain and update a plurality of ATC voice groups, with each voice group pertaining to an ATC voice station and containing all of the UAS that assigned to communicate with the ATC voice station pertaining to the ATC voice group.

In one or more examples, and as briefly described above, the ATC voice processor 414 (using information provided spectrum management system 410) can designate a single UAS within a particular ATC voice group to act as a "relay aircraft" on behalf of all of the aircraft in the voice group. Alternatively, in one or more examples, the spectrum management system 410 itself can designate a relay aircraft based on real-time knowledge of the spectral conditions and position of the aircraft in a particular ATC group. Thus, in the exemplary system 400 of FIG. 4, in one or more examples, UAS 402D can be designated by the ATC voice process 414 to act as the voice traffic relay for the ATC voice group associated with ATC voice station. In one or more examples, the spectrum management system 410 can use the flight plans submitted to the system by users (described above) to select the UAS that will act as the voice traffic relay for a particular ATC voice group either directly or by supplying the information to the ATC voice process 414 who can ultimately decide which aircraft to designate as the relay aircraft. In one or more examples, the ATC voice processor can select the voice traffic relay UAS for a particular group based on determining which UAS of the members of a particular ATC voice group has the best available level of signal quality to ensure a high-quality radio link between the ATC voice station and the UAS. In this way, since the voice traffic relay UAS may act as the only link between an ATC voice station and all of the UAS in an ATC voice group, the chance of a communications error is minimized by selecting the UAS with the most reliable communications channel to the ATC voice station to act as the voice traffic relay.

Figure 5:
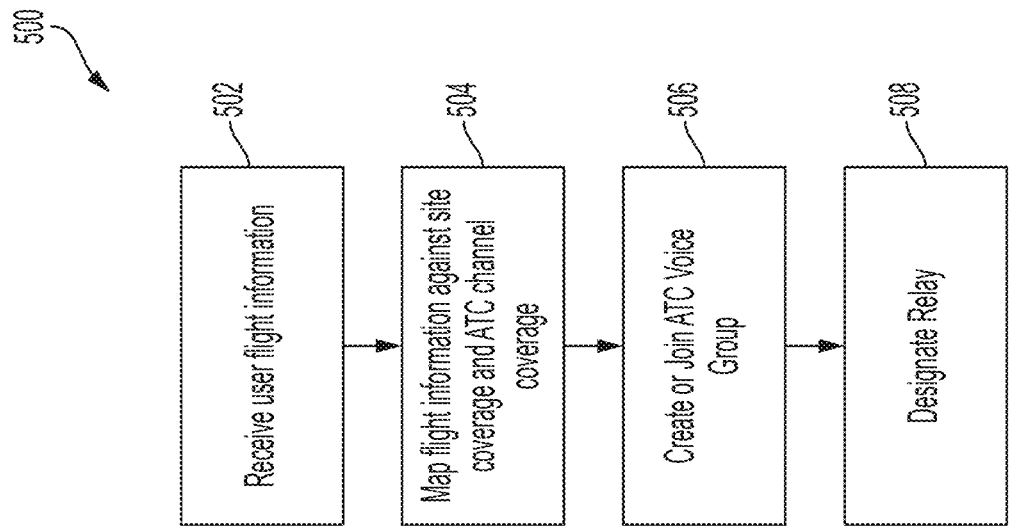
FIG. 5 illustrates an exemplary process for designating a relay aircraft based on a flight plan submitted to a spectrum management according to examples of the disclosure.

FIG. 5 illustrates an exemplary process for designating a relay aircraft based on a flight plan submitted to a spectrum management according to examples of the disclosure. In one or more examples, the process 500 illustrated in FIG. 5 can begin at step 502 wherein a flight plan is received by the spectrum management system (such as the spectrum management system 410 of FIG. 4). In one or more examples, the flight plan can include information about an intended flight and can include flight mission details such as the intended timing, altitude, location, and speed of the aircraft during a proposed flight.

Once a flight plan has been received at step 502, the process 500 can move to step 504 wherein a spectrum management system can be used to map the received flight plan against the spectrum coverage of both the aviation network and the ATC network. In one or more examples, the spectrum management system can be configured in substantially the same manner as described above with respect to FIGS. 1-3 and thus can be configured to geofence one or more areas implicated by the received flight plan to determine a RF channel (or other traffic communications resource) to allocate to the aircraft for a flight, based on the availability of RF channels and other resources available for allocation, and the quality of communications for a given traffic resource during the duration of the flight. In one or more examples, in addition to geofencing the aviation network, the spectrum management system can also be configured to geofence the air traffic control network (i.e., the one or more ATC voice stations implicated by a flight plan) to determine the best voice path for a given aircraft during its flight. In one or more examples, determining the best voice path can include determining what ATC voice station a given flight will be associated with at any given moment during a flight, and ensuring that the flight will have the ability to establish any necessary VHF links with the ATC voice station it is associated it during the flight based on the availability of traffic resources. Thus, in one or more examples, based on the received flight plans, the spectrum management system can predict the UAS vehicles belonging to a particular ATC voice group, and can also predict their quality of communications to the ATC voice station. In one or more examples, if the geofencing of both the aviation network signal availability and ATC signal availability determines that there is not adequate signal for either radio network during the flight, then in one or more examples, the spectrum management system can reject the flight plan and inform the requestor that adequate signal availability is not available during their proposed flight.

In one or more examples, once the flight plan information has been mapped, the process 500 can move to step 506 wherein the information can be used to create an ATC voice group, or alternatively add one or more flights (pertaining to the received flight plans) to a pre-existing ATC voice group. In one or more examples, the spectrum management system can provide information pertaining to a flight to an ATC voice processor which can create, maintain, and update ATC voice groups for a digital aviation network. In one or more examples, the flight plan information can be used to predict the members of an ATC voice group at any given moment in time, however, a given UAS may not be able to actually join the ATC voice group until instructed to tune their VHF frequency to the ATC voice station associated with the ATC voice group. Thus, in one or more examples, step 506 can be performed using the flight plan itself, and/or additionally based on what VHF radio frequency a given UAS's radio is tuned to. In one or more examples, if a pilot commands the UAS they are piloting to change its tuned VHF frequency, then in one or more examples, the spectrum management system can register the command and use it to automatically place the UAS into a new ATC voice group based on the frequency entered by the pilot.

In one or more examples, the ATC voice processor can work in conjunction with the spectrum management system to ensure that pilots on the digital aviation network are tuned to the correct ATC voice VHF frequency based on their position. For instance in one or more examples, the spectrum management system can define all associated VHF frequencies to the areas or sectors covered by a ground-based ration on the aviation network, and can relay the expected VHF frequency for a flight at any given moment in time to the ATC voice processor. In one or more examples, if the ATC voice processor determines that a pilot's tuned VHF frequency does not match the frequency expected by the spectrum management system, then in one or more examples, the ATC voice processor can alert the pilot to the discrepancy. In one or more examples, the ground base station scheduler (i.e., aviation network core) can update the assigned spectrum resources for each aircraft based upon information provided by the spectrum management system during a flight, thus ensuring that the proper amount of radio resources are always available for ATC voice traffic. Thus, as part of the creating or joining an aircraft to a particular ATC voice group, the ATC voice processor at step 506 can use the spectrum management system as a check to determine that the ATC voice group that is being assigned to aircraft (based on the frequency that it's VHF radio is tuned to) matches with the expected voice group based on the UAS' submitted flight plan.

In one or more examples, once the process 500 has created or updated an ATC voice group at step 506, the process 500 can move to step 508 wherein the ATC voice processor (or the spectrum management system) can designate a relay aircraft for the ATC voice group. In one or more examples, step 508 can include using the geofence information associated with each flight plan from the spectrum management system to determine which UAS in the ATC voice group has the highest quality communications link with the ATC voice station associated with the ATC voice group. In one or more examples, the spectrum management can not only use the geofence information created when determining RF availability for a flight, but can also use real-time spectral conditions to designate a relay aircraft, or provide that information to the ATC voice processor so that it can designate the relay. In this way, the UAS relay designated at step 508 can represent the UAS with the lowest probability of link failure when communicating with the ATC voice station. Since the designated relay may be the only link to the ground for the UAS of the voice group, minimizing the probability of link failure can be critical to ensuring safety of the overall air network.

In one or more examples, the designated voice traffic relay (designated using the process described above with respect to FIG. 5) for an ATC voice group can be responsible for receiving analog VHF voice communications from an ATC voice station, converting the analog voice signal to a digital voice signal, and then transmitting the digital signal to the aviation network, where the voice channel can be multi-cast to all of the pilots operating UAS in the ATC voice group associated with the ATC voice station that originated the voice communication.

In one or more examples, at step 508, the relay can be dynamically designated (i.e., the relay aircraft can be changed based on spectral conditions seen by, for example, the spectrum management system). In one or more examples, the ATC voice processor (in conjunction with information provided by the spectrum management system) can assign a relay aircraft based upon the timing of a request to transmit. In one or examples, and in the case in which the relay assignment is dynamic, all UAS in an ATC voice group can have the ability to receive the ATC to Pilot voice transmission through their respective onboard VHF radios. In one or more examples, when ATC initiates the VHF voice transmission to a pilot, all UAS VHF radios assigned to the VHF frequency (i.e., the ATC voice group) can receive the information. In one or more examples, each UAS radio can convert the received ATC VHF signal from analog to digital via a vocoder and can then request a radio resource from the ground base station. In one or more examples, the ground base station will only have the radio resources assigned to it by the spectrum management system, and thus will process only the first initiated request from all UAS assigned to that VHF frequency. In one or more examples, all other requests during the active transmission from ATC along the VHF frequency will be rejected by the system allowing only one ATC to Pilot transmission to occur. In one or more examples, if the aviation network is setup to allow more radio links from the UAS to the ground-based radio, duplicate transmissions received by the aviation network core (ATC processor) can manage the delivery of the message ignoring duplicate messages. In one or more examples, the selection of the message to forward by the ATC voice processor could be based upon time, radio link quality or even priority access assigned to the airborne radio and pilot.

In one or more examples, the digital aviation network can process and relay all ATC voice traffic through a ground-based relay (as opposed to a UAS relay) so as to relay communications between ATC and individual pilots in both directions. In one or more examples, a ground-based relay could be used for aircraft that are on the ground, and are communication with ATC. Thus, in one or more examples (and in conjunction with information provided by the spectrum management system), at step 508 rather than designating a relay aircraft, instead the ATC voice processor can designate a ground-based relay to act as the relay for one or more ATC voice groups.

Figure 6:
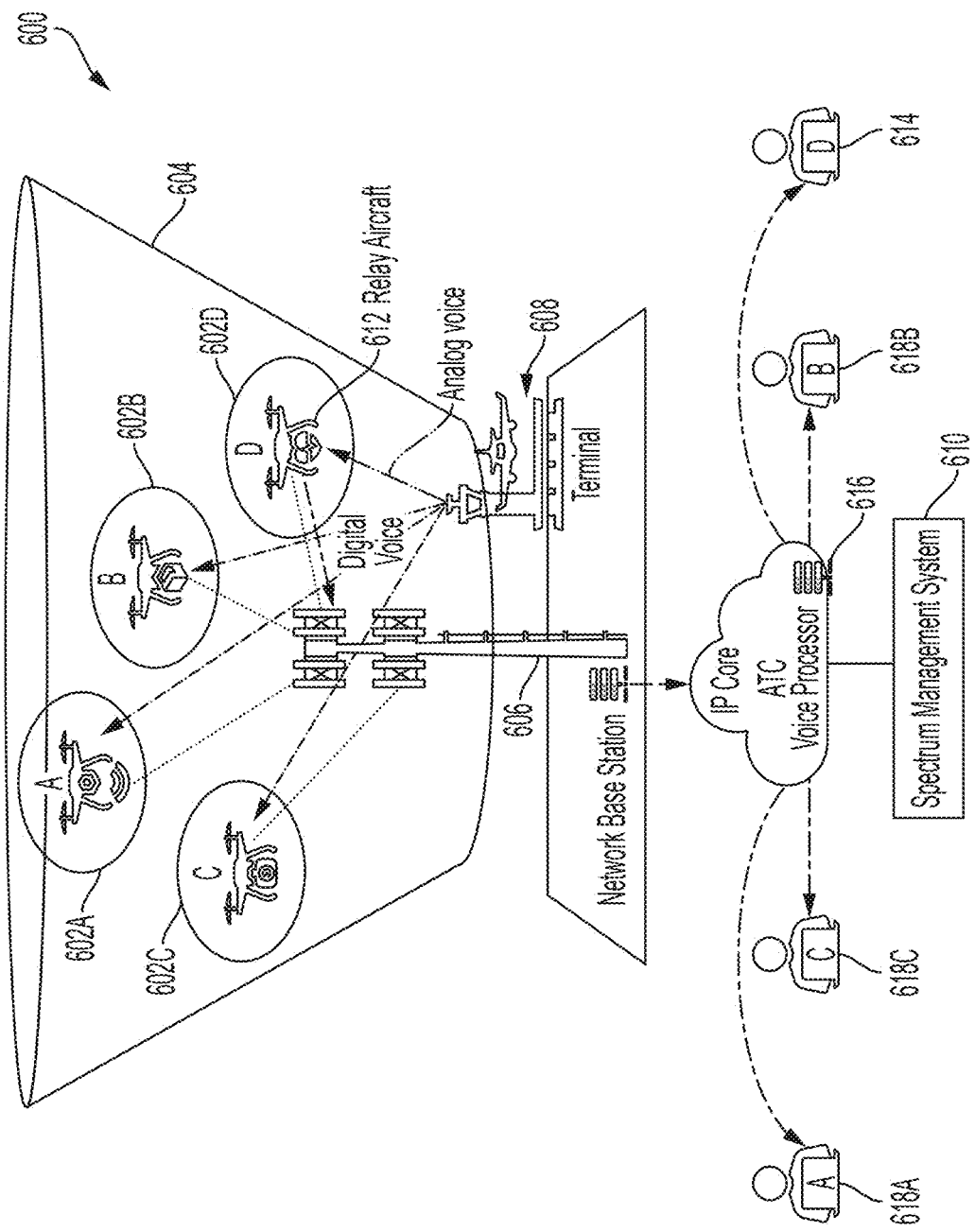
FIG. 6 illustrates an exemplary system for relaying ATC voice through unmanned aircraft systems to operators according to examples of the disclosure.

FIG. 6 illustrates an exemplary system for relaying ATC voice through unmanned aircraft systems to operators according to examples of the disclosure. The example system 600 of FIG. 6 is substantially similar to the example system 400 of FIG. 4 but has been further annotated to illustrate specific features associated with using a single relay UAS to facilitate communications between one or more pilots in an aviation network. The exemplary system 600 illustrates an ATC voice group that includes aircraft 602A-C as well as a designated relay UAS 612 that are in communication with an ATC voice station 608. In one or more examples, each of the UAS 602A-C as well as the designated relay UAS 612 can also be communicatively coupled to a base station 606 of an aviation network. In one or more examples, ATC voice station 608 can transmit an analog voice signal (at its designated carrier frequency in the VHF range) over its coverage area. In one or more signals, the aircraft assigned to ATC voice station 608 can include both unmanned and manned aircraft. In the case of the manned aircraft tuned to ATC voice station 608, the pilot (sitting in the aircraft) can directly listen to the voice communication transmitted by ATC voice station 608 using the radio located in their aircraft.

However, in the case of unmanned aircraft (i.e., UAS), and as described above, the pilot may not be located in the same geographic area as the UAS they are piloting, and thus may be unable to directly listen to the analog voice communication transmitted by the ATC voice station 608 since they are not within the range of the voice communication. Thus, in one or more examples, the designated relay UAS 612 can include a VHF radio that is configured to both receive and transmit VHF signals. In one or more examples, the other UAS in the ATC voice group (i.e., UAS 602A-C) can also include a VHF radio that is configured to both receive and transmit VHF signals (which can be utilized in certain contexts as described below). Thus, in one or more examples, regardless of their status (i.e., designated relay), each and every UAS in the aviation network needing ATC voice services can be configured to receive VHF voice traffic from the ATC voice station and can also transmit VHF voice traffic to an ATC voice station.

Figure 7:
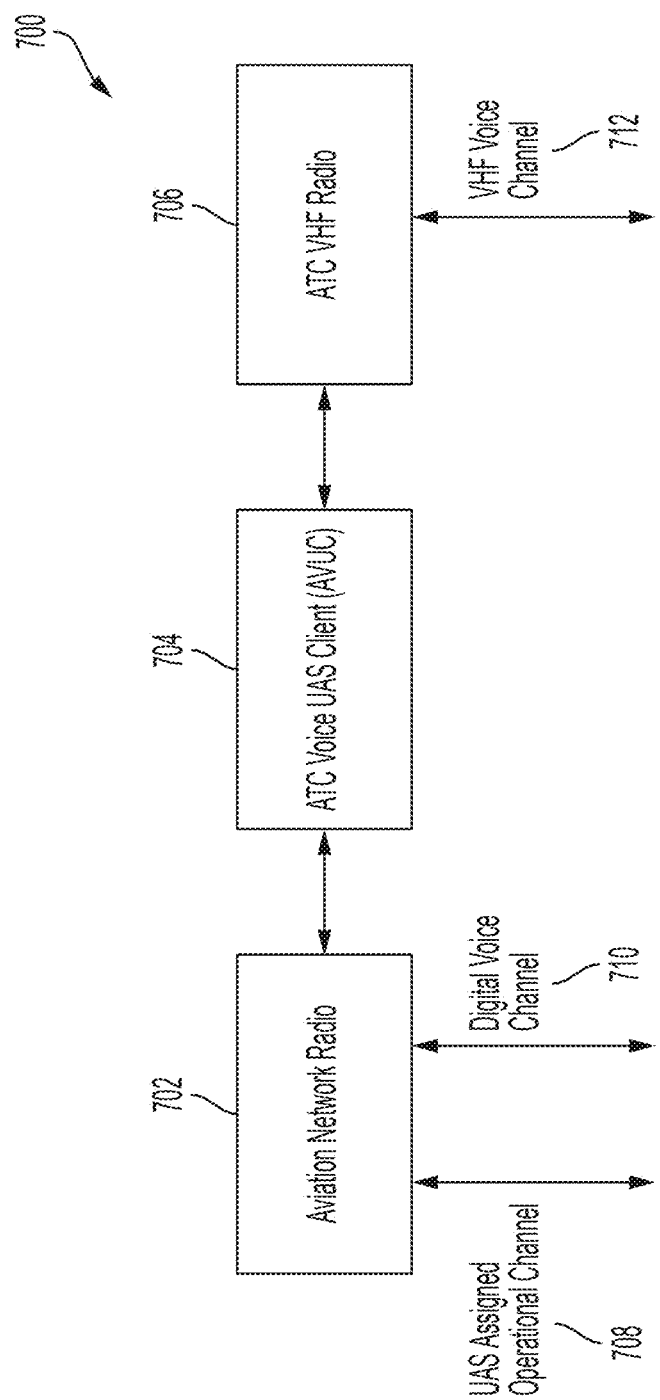
FIG. 7 illustrates an exemplary UAS communications system according to examples of the disclosure.

FIG. 7 illustrates an exemplary UAS communications system according to examples of the disclosure. In one or more examples, the communications system 700 can be fitted aboard a UAS and can be configured to allow for the UAS to communicate with ATC, its pilot, and the aviation network it is operating in. In one or more examples, the communications system 700 can include an ATC VHF radio 706 (as described above). In one or more examples, ATC VHF radio 706 can be configured to allow for the UAS to transmit and receive VHF radio communications using a VHF voice channel 712. In one or more examples, the ATC VHF radio can be configured to receive digital voice traffic and convert the digital voice traffic to an analog voice signal. In one or more examples, the ATC VHF radio 706 can then transmit the analog voice signal using a VHF voice channel 712 that is tuned to the frequency of the ATC voice station that the UAS is communicating with. While radio 706 is described as a "VHF" radio, the disclosure should not be seen as limiting, and radio 706 can operate in any frequency range that is needed to communication with an air traffic controller or other entity using voice communications.

In one or more examples, the communications system 700 can include an aviation network radio 702 that is configured to facilitate communications between the UAS and the ground base station of the aviation network described above. In one or more examples, the aviation network radio 702 can be configured to transmit and receive operational information and commands from its pilot and from the aviation network using its assigned operational channel 708 assigned to it by the spectrum management system (as described above). In one or more examples, and as will be described in detail later below, the aviation network radio 710 can also be configured to communicate to a ground base station using a digital voice channel 710. In one or more examples, the digital voice channel 710 can carry digital voice signals to and from the UAS via the aviation network radio 702. Thus, in one or more examples, the aviation network radio 702 can be configured to transmit and receive the digital voice signals to and from the ground base station.

In one or more examples, the communications system 700 can also include an ATC Voice UAS Client (AVUC) 704. In one or more examples, the AVUC 704, which may be within or a separate device from the Aviation Network radio 702, can be configured to act as an interface between the Aviation Network radio 702 and the ATC VHF radio 706. In one or more examples, AVUC 704 can be configured to receive control information from aviation network radio 702 which it can then use to command and control ATC VHF radio 706. As an example of control information, the AVUC can receive information control information relating to what frequency to set ATC VHF radio at (so that it can communicate with its assigned ATC voice station), and can also receive control information indicating whether or not the UAS is the designated relay for its ATC voice group, or if it otherwise will need to relay voice traffic between ATC and the ground.

In one or more examples, the AVUC 704 can receive digital voice signals via the digital voice channel 710, convert the digital voice signals to analog voice signals, and then instruct the ATC VHF radio 706 to transmit the analog voice signal using the VHF voice channel 712. Additionally, in one or more examples, the AVUC 704 can receive analog voice signals from the ATC VHF radio received vi the VHF voice channel 712, convert the analog signals to a digital voice signal, and then transmit the digital voice signal to the ground station using the digital voice channel 710 via the Aviation Network radio 702.

Returning to the example system 600 of FIG. 6, in one or more examples, when ATC voice station 608 broadcasts a voice message to all of the aircraft assigned to it, in one or more examples, each and every UAS in the ATC voice group corresponding to the ATC voice station 408 can receive the voice message using its ATC VHF radio (described above with respect to FIG. 7). However, in one or more examples, only the designated relay 612 may then convert the received analog voice signal to a digital voice signal and transmit the digital voice signal to the base station 606. In one or more examples, the ground base station 606 can be configured to transmit the received digital voice signal to the ATC voice processor, which in a process described in detail further below) can transmit the digital voice signal to each and every pilot 618A-C, as well as the pilot 614 of the designated relay 612 thus allowing them to hear the voice transmission that originated from the ATC voice station 608.

Figure 8A:
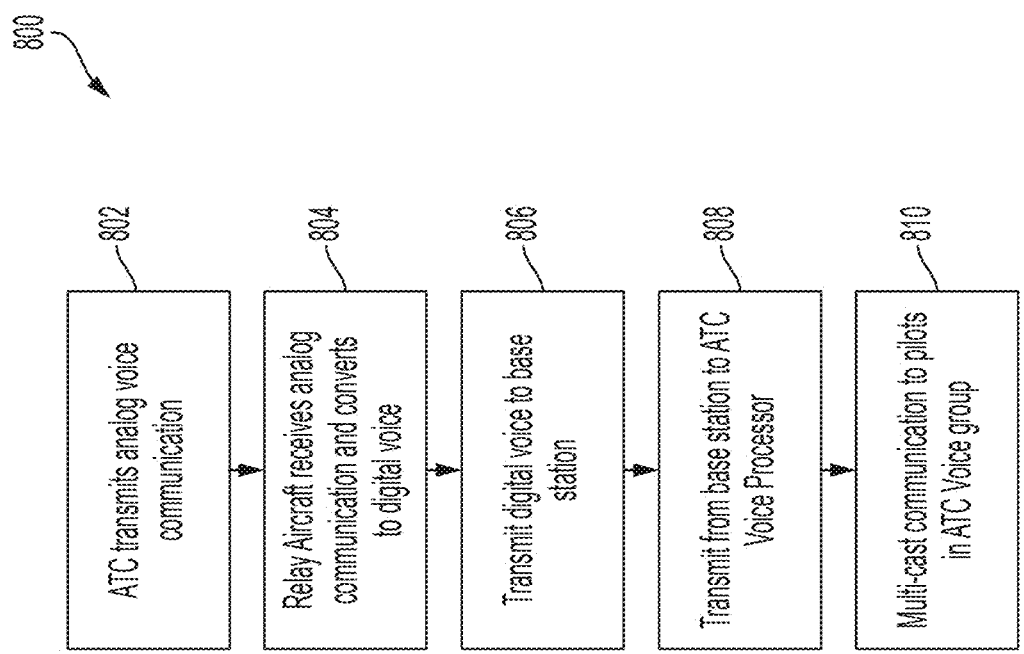
FIG. 8A illustrates an exemplary process for transmitting ATC voice communications to one or more pilots in an aviation network according to examples of the disclosure.

FIG. 8A illustrates an exemplary process for transmitting ATC voice communications to one or more pilots in an aviation network according to examples of the disclosure. In one or more examples, the process 800 of FIG. 8 can begin with step 812 wherein an ATC voice station broadcasts an analog voice signal (modulated to be carried by a VHF signal at a pre-determined frequency). In one or more examples, and as described above, while the analog voice signal transmitted by the ATC voice station may be intended for a particular aircraft, in one or more examples, it may be necessary for each and every aircraft assigned to a particular ATC voice station, to hear each and every voice message transmitted from and to the ATC voice station. Thus, in one or more examples, once an ATC voice transmission is broadcast at step 802, the process 804 can move to step 804 wherein the relay aircraft receives the analog communication and converts the analog signal to a digital voice signal. In one or more examples, and as discussed above, a particular ATC voice group may only include a single designated relay that can act to relay voice communications from ATC to the pilots on the ground. Thus, in one or more examples, while each and every UAS in a particular ATC voice group may be configured to receive VHF voice communications from the ATC voice station, the designated relay may be the only UAS that will go through the process of converting the analog ATC voice traffic to a digital voice signal.

In one or more examples, at step 804, the analog voice signal can be converted to a digital voice signal in order to decrease the overall bandwidth of the voice traffic so that it can be sent using a narrow-band RF channel down to the pilots via the ground base station. In one or more examples, once the designated relay UAS receives the analog communication from the ATC voice station and converts the analog voice signal to a digital voice signal, then the process 800 can move to step 806 wherein the UAS, and specifically by using its Aviation Network Radio can transmit the digital voice signal to the ground based station it is communication with. In one or more examples, and referring to FIG. 6, the base station 606 can direct an RF beam using its beam forming antenna towards the designated relay UAS 612. The RF beam can be used to create a dedicated digital voice channel between the designated relay UAS 612 so that the UAS can transmit digital voice audio to the ground base station 606 and receive digital voice audio from the ground base station 606.

Referring back to FIG. 8A, once the UAS transmits the digital voice audio to the ground base station, then in one or more examples, the process 800 can move to step 808 wherein the ground base station transmits the received digital voice audio (received over the dedicated digital voice channel) to an ATC voice processor of the aviation network. In one or more examples, and as described above, the ground base station can transmit the digital video to the ATC voice processor using the IP core of the aviation network which connects the ground base station to other components of the aviation network.

In one or more examples, once the ATC voice processor receives the transmitted digital voice from the base station at step 808, then the process 800 can move to step 810 wherein the ATC voice processor can multi-cast the received communication to the individual pilots in the ATC voice group. In one or more examples, multi-casting can include creating copies of the received digital voice message and then transmitting the digital voice message copies to each individual pilot that is part of the ATC voice group. Thus, in this way, each and every pilot can receive the ATC voice communication, while only a single UAS of the ATC voice group (i.e., the designated relay) relayed the voice communication from the ATC voice station to the pilots of the ATC voice group. In one or more examples, each pilot ground station (i.e., the computing systems and hardware they use to conduct a flight) can include a vocoder that is configured to convert digital voice to analog voice, and analog voice to digital voice. Thus, in one or more examples, when a pilot receives a multi-cast voice communication at step 810, the vocoder located at the pilot's ground station can be used to convert the digital voice signal into an analog voice signal, thus allowing the pilot to listen to the ATC voice message transmitted from its assigned ATC voice station.

Figure 8B:
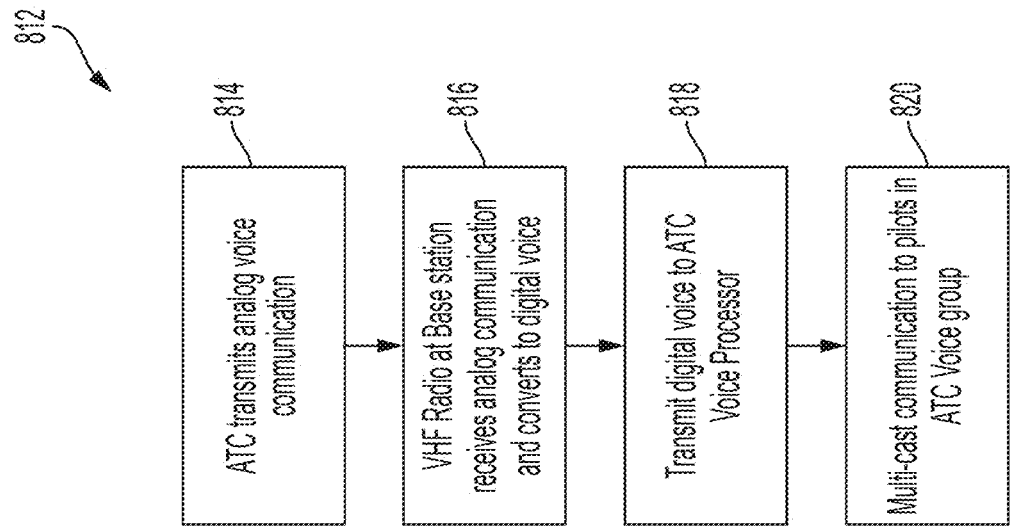
FIG. 8B illustrates another exemplary process for transmitting ATC voice communications to one or more pilots in an aviation network according to examples of the disclosure.

In one or more examples, rather than using a designated relay aircraft to transmit voice communications from the ATC voice station to the base station (where it can be then sent to the pilots via the ATC voice processor, in one or more examples, the ATC voice communication can be received directly by the a VHF radio located on the base station. Thus, the VHF radio at the ground base station can act as the relay for one or more ATC voice groups. FIG. 8B illustrates another exemplary process for transmitting ATC voice communications to one or more pilots in an aviation network according to examples of the disclosure. In one or more examples, the process 812 of FIG. 8B can begin at step 814 wherein the ATC voice station transmits an analog voice communication, as similarly described above with respect to step 802 of FIG. 8A.

In one or more examples, once the ATC voice station transmits an analog voice communication at step 814, the process 812 can move to step 816 wherein the transmitted signal can be received by the a VHF radio located at the ground base station. As described above, in order for the ground base station to be able to directly receive the ATC voice communication transmitted from the ATC voice station, in one or more examples, the ground base station may be in the line of sight of the ATC voice station VHF transmitter thus enabling it to directly receive the VHF voice transmission from the ATC voice station. In one or more examples, the base station upon receipt of the analog voice communication, can convert the signal into a digital voice communication.

In one or more examples, once the base station receives the analog voice signal and converts it to a digital voice signal at step 816, the process 812 can move to step 818 wherein the digital voice communication is transmitted to the ATC voice processor. In one or more examples, the base station can transmit the digital voice signal to the ATC voice processor using the IP core of the aviation network. After receiving the digital voice communication at the ATC voice processor at step 818, the process 812 can move to step 820 wherein the ATC voice processor can multi-cast the received digital communication to the pilots belonging to the ATC voice group corresponding to the ATC voice station that originated the voice communication.

In one or more examples, the digital aviation network can utilize both the processes described in FIG. 8A and FIG. 8B to pass ATC voice communications to pilots on the ground. In such as hybrid approach, the choice of whether to use a designated relay or use a relay located on the base station can depend on whether the aviation network has acceptable coverage at the ground base station to receive VHF signals from a particular ATC voice station. Therefore, in one or more examples, some VHF communications from ATC can be received by the ground base station, while other may be received using the designated relay as described above. In one or more examples, having the relay located on the ground base station can result in reduced latency and higher voice quality due to the ability of using a higher rate vocoder (since the size of the relay on the ground base station may not be as constrained as the size of the relay on a UAS).

Referring back to the example of FIG. 8A, the process 800 can allow for a single designated relay UAS to field communications from an ATC voice station and transmit it to the other pilots in the ATC voice group. Since the spectrum management system can use the flight plans of the UAS in the ATC voice group to determine which UAS has the best quality communications link to the ATC voice station, the designated relay can provide a reliable service to the other UAS in the ATC group insofar as ensuring that the other UAS also receive voice transmission originating from the ATC voice station. However, in the case of voice traffic originating from a pilot, the designated relay model described above may not be the preferred approach to transmitting voice communications to the ATC voice station. When a pilot is transmitting a voice message to ATC, it may not only be important that ATC voice station receive the transmission, it may also be important that any manned or unmanned aircraft that are within the radio service of the UAS (i.e., in the closest proximity to) piloted by the initiating pilot also receive the voice communication, since the information relayed by the pilot will likely affect them more than aircraft in the ATC voice group that are further away from the initiating pilot's UAS. If the designated relay is not the same UAS that corresponds to the pilot initiating a voice transmission, then while the ATC voice station may receive the transmission, pilots that are closest to the UAS of the originating pilot may not receive the transmission. Thus, in or more examples, in the event that a pilot initiates a voice communication, ensuring that the corresponding UAS is used to relay the voice transmission can help to ensure that adjacent aircraft receive the voice transmission.

Figure 9:
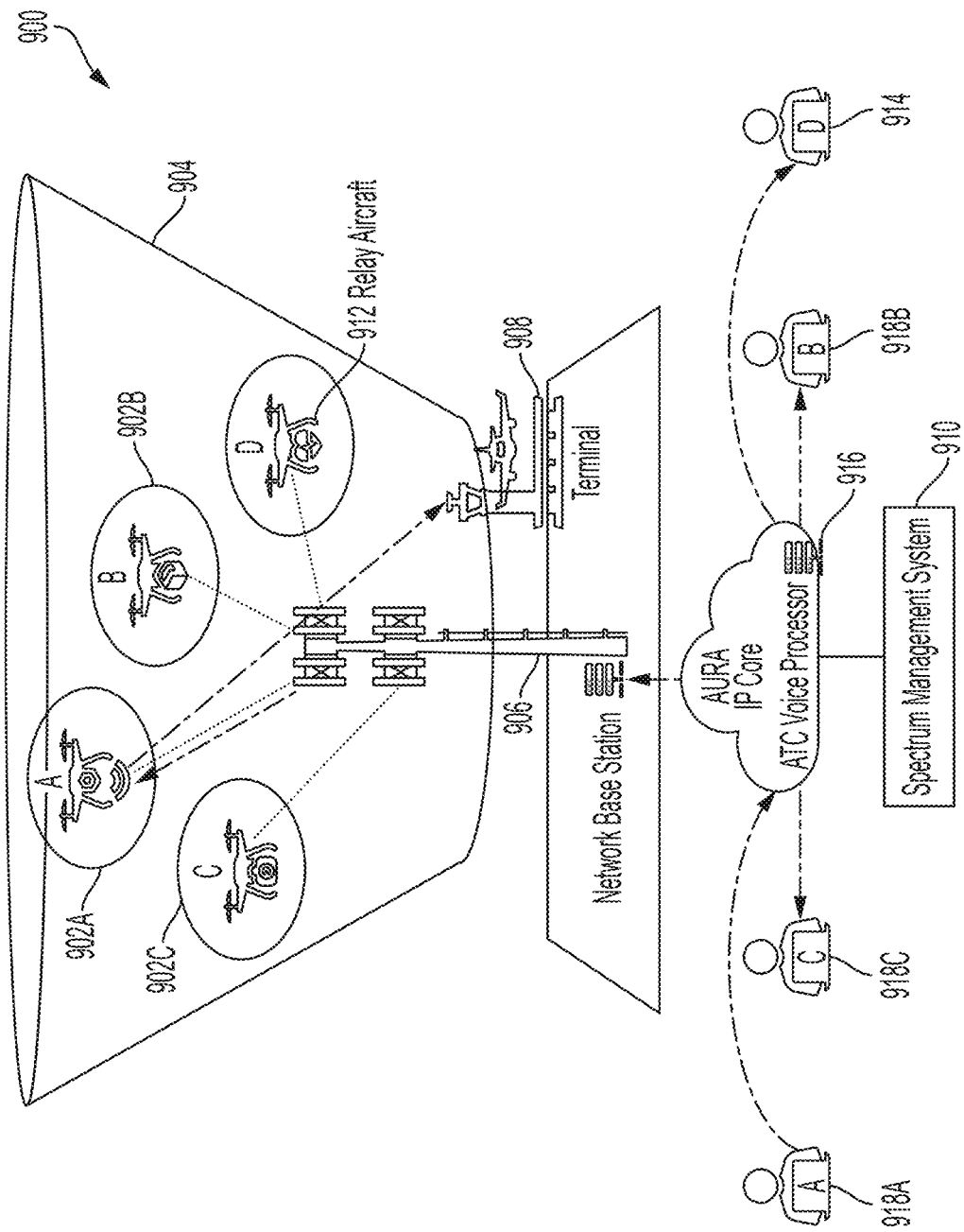
FIG. 9 illustrates an exemplary system for relaying operator communications through unmanned aircraft systems to ATC according to examples of the disclosure.

FIG. 9 illustrates an exemplary system for relaying operator communications through unmanned aircraft systems to ATC according to examples of the disclosure. The example system 900 of FIG. 9 is substantially similar to the example system 400 of FIG. 4, but has been further annotated to illustrate specific features associated with transmitting a pilot's voice communication the other aircraft in its ATC voice group as well as the pilot's assigned ATC voice station. In one or more examples, the system 900 can include a plurality of UAS 902A-C as well as a designated relay UAS 912 that collective can belong to an ATC voice group associated with the coverage area 904 corresponding to ATC voice station 908.

In one or more examples, pilot 918A (who is piloting UAS 902A) can initiate a voice communication to be sent to the ATC voice station 908 as well as the other aircraft in the coverage area 904. In one or more examples the vocoder at pilot 918A's ground station (can convert the pilot's analog voice signal and convert it to a digital voice communication. In one or more examples, the pilot 918A's digital voice signal can then be transmitted to the ATC voice processor 916. In one or more examples upon receiving the digital voice signal can multi-cast the voice signal to the other pilot's in the ATC voice group (i.e., pilots 918B-C and pilot 914) using the IP core of the aviation network.

In addition to multi-casting the digital voice communication to all of the pilots in the ATC voice group who are also part of the aviation network, in one or more examples, the ATC voice processor 916 can also transmit the digital voice transmission to the base station 906 that is servicing the UAS 902A corresponding to pilot 918A. As will be described in further detail below, the ground base station 906 can direct a digital voice channel (using the beam null steering antenna) to provide a dedicated digital voice channel to pass digital voice transmissions between the bases station and the UAS 902A. In one or more examples, once the digital voice channel has been established, the ground base station 906 can transmit the digital voice communication to the UAS 902A. A radio communications system onboard UAS 902A, which in one or more examples, can be substantially similar to the example of FIG. 7, can receive the digital voice transmission, convert the digital signal to an analog signal, and transmit the analog voice signal on a VHF frequency to the ATC voice station as well as the other aircraft within the coverage area of the UAS 902A's VHF radio coverage area.

Figure 10A:
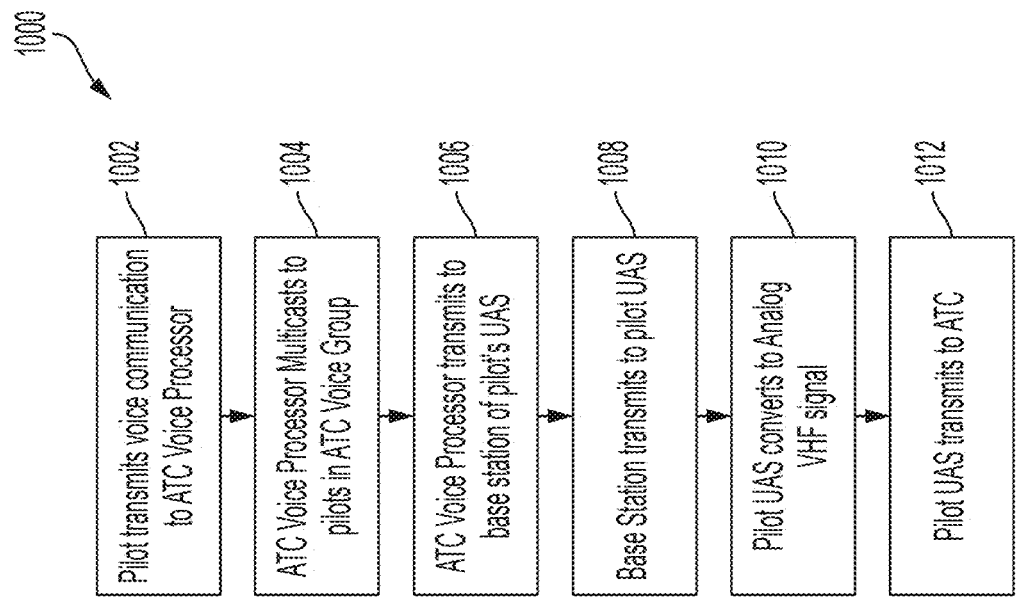
FIG. 10A illustrates an exemplary process for transmitting ATC voice communications from a pilot of a UAS to an ATC voice station according to one or more examples of the disclosure.

FIG. 10A illustrates an exemplary process for transmitting ATC voice communications from a pilot of a UAS to an ATC voice station according to one or more examples of the disclosure. In one or more examples, the process 1000 of FIG. 10A can begin at step 1002, wherein the pilot transmits a voice communication to an ATC voice processor of the aviation network. In one or more examples, the pilot can initiate a voice communication using a push-to-talk (PTT), also known as press-to-transmit, a method of having conversations or talking on half-duplex communication lines. in which the pilot can press and hold down a button to initiate a voice communication. In one or more examples, at step 1002, the pilots analog voice communication can be converted into a digital voice communication using the vocoder described above with respect to FIG. 8 and then transmitted to the ATC voice processor.

In one or more examples, once the digital voice communication has been transmitted to the ATC voice processor, the process 1000 can move to step 1004 wherein the ATC voice processor multi-casts the digital voice signal to the to the other UAS pilots in the ATC voice group and that are connected to the ATC voice processor via the aviation network IP core. In this way, each pilot in the UAS aviation network and who are part of the same ATC voice group as the originating pilot can also receive the voice communication. In one or more examples, and either after or in parallel to step 1004, the ATC voice processor can also transmit the digital voice communication to the base station servicing the pilot's UAS on the aviation network. In one or more examples, and at step 1006, upon receiving the digital voice communication from the ATC voice processor, in one or more examples, the ground base station can send a signal over the dedicated operational communication channel of the UAS corresponding to the pilot that transmitted the voice communication instructing the UAS to tune its aviation network radio to a specific dedicated voice channel (or other traffic resource allocated for ATC voice communications), so that it can receive the digital voice communication. In one or more examples, the digital voice channel can be the same voice channel (i.e., the same frequency) or the same traffic resource that is used by the designated relay to transmit ATC voice traffic from the ATC voice station to the ground base station. Thus, in one or more examples, a resource scheduler of the base station can cause the beam/null steering antenna of the base station to direct a digital voice channel beam away from the designated relay aircraft to the UAS corresponding to the pilot of the voice communication, so that the UAS can receive the digital voice transmission from the ground.

In one or more examples, once the ground base station has configured the base station to create a digital voice channel for the UAS corresponding to the pilot that originated the communication, and once the ground base station has sent an operational command signal to the UAS instructing the UAS to tune its digital voice radio to the frequency of the channel established by the ground base station, then in one or more examples, the process 1000 can move to step 1008 wherein the base station transmits to the pilot UAS. In one or more examples, once the UAS receives the digital voice communication at step 1008, the process 1000 can move to step 1010 wherein the UAS converts the received digital communication to an analog voice signal. In one or more examples of the disclosure, the UAS can utilize the AVUC to perform the conversion. Finally, once the digital communication has been converted into an analog voice signal, then in one or more examples, the UAS can transmit the analog voice signal to the ATC voice station (and other aircraft within the coverage area of the UAS) using its VHF radio at step 1012. By using the specific UAS associated with the pilot originating a voice communication to relay the voice traffic to the ATC voice station, the planes that are in closest proximity to the UAS are more likely to receive the voice communication, which can be critical to ensuring safe operation of the airspace occupied by the ATC voice group.

In one or more examples, and as described above, the assignment of aircraft to an ATC voice group can be a dynamic process. In other words, any given UAS may switch their ATC voice group multiple times during the course of a flight. Thus, from the perspective of a particular ATC group, the members of the group may be changing constantly. In one or more examples, a designated relay can also be moved out of an ATC voice group as it goes through its flight. Thus, in one or more examples, the ATC voice processor can keep track of the ATC voice groups in the aviation network and manages the radio channel and voice paths for the ATC voice groups to ensure that each ATC voice group maintains a voice channel link with the ATC voice station associated with the ATC voice group.

Figure 10B:
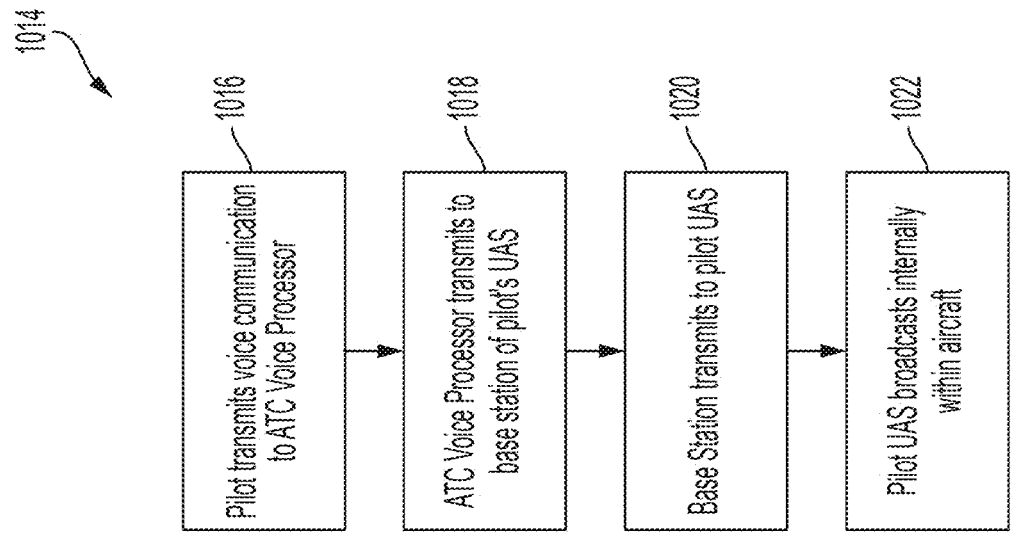
FIG. 10B illustrates an exemplary process for transmitting voice communications from a pilot of a UAS to an aircraft associated with the pilot according to one or more examples of the disclosure.

FIG. 10B illustrates an exemplary process for transmitting voice communications from a pilot of a UAS to an aircraft associated with the pilot according to one or more examples of the disclosure. In one or more examples, the process 1014 can be utilized in situations in which a pilot on the ground would like to provide a voice command or communication to the aircraft they are piloting (for instance to speak with passengers on the flight) without having that voice transmission transmitted to an ATC voice station and/or other pilots that are flying within the aviation network or in the same ATC voice group. In one or more examples, the process 1014 can begin at step 1016 wherein a pilot transmits a voice communication to the ATC voice processor. In one or more examples, and at step 1016, in order to distinguish a voice communication meant only for the aircraft from a voice communication intended for an air traffic controller, the pilot can engage a switch (mechanical or via a graphical user interface) that allows the system to recognize that the voice transmission is intended for the aircraft rather than ATC. In one or more examples, at step 1016, when the pilot provides an indication that a voice transmission is meant for the aircraft, the subsequent voice transmission when digitized can include a packet header or other information bits indicating that the transmission is meant for the aircraft rather than ATC. Likewise, when a voice transmission is meant for ATC, the voice transmission can be encoded with a packet header that indicates that the voice transmission is meant for ATC.

In one or more examples, once the pilot has transmitted the voice communications to the ATC voice processor at step 1016, the process 1014 can move to step 1018 wherein the ATC voice process transmits the voice communication to the base station of the aviation network associated with the aircraft that pilot is operating. In one or more examples, step 1018 can operate in substantially the same manner as step 1006 of process 1000 described above with respect to FIG. 10A. Thus in one or more examples, and at step 1018, upon receiving the digital voice communication from the ATC voice processor, in one or more examples, the ground base station can send a signal over the dedicated operational communication channel of the UAS corresponding to the pilot that transmitted the voice communication instructing the UAS to tune its aviation network radio to a specific dedicated voice channel (or other traffic resource allocated for ATC voice communications), so that it can receive the digital voice communication. In one or more examples, the digital voice channel can be the same voice channel (i.e., the same frequency) or the same traffic resource that is used by the designated relay to transmit ATC voice traffic from the ATC voice station to the ground base station. Thus, in one or more examples, a resource scheduler of the base station can cause the beam/null steering antenna of the base station to direct a digital voice channel beam away from the designated relay aircraft to the UAS corresponding to the pilot of the voice communication, so that the UAS can receive the digital voice transmission from the ground.

In one or more examples, once the ATC voice processor transmits the voice communication to the base station of the pilot's UAS at step 1018, the process 1014 can move to step 1020 wherein the ground base station can transmit relay the received transmission to the UAS associated with the pilot. In one or more examples, step 1020 of process 1014 can operate in substantially the same manner as step 1008 of process 1000 described above with respect to FIG. 10A. In one or more examples, when the aircraft receives the transmission sent from the ground base station at step 1020, the process 1014 can move to step 1022 wherein a processor on the aircraft's radio can determine whether the received voice transmission should be transmitted to ATC (via a VHF radio) or whether the voice communication should be transmitted internally within the aircraft. In one or more examples, at step 1022, the processor on the aircraft can make the determination based on the packet or header appended to the voice transmission described above with respect step 1016. Finally, at step 1024, if the processor determines that the transmission is an internal communication (i.e., not meant for ATC), then in one or examples, the UAS can allow the transmission to be broadcast within the aircraft without forwarding the transmission to the ATC voice station over its VHF radio.

Figure 11:
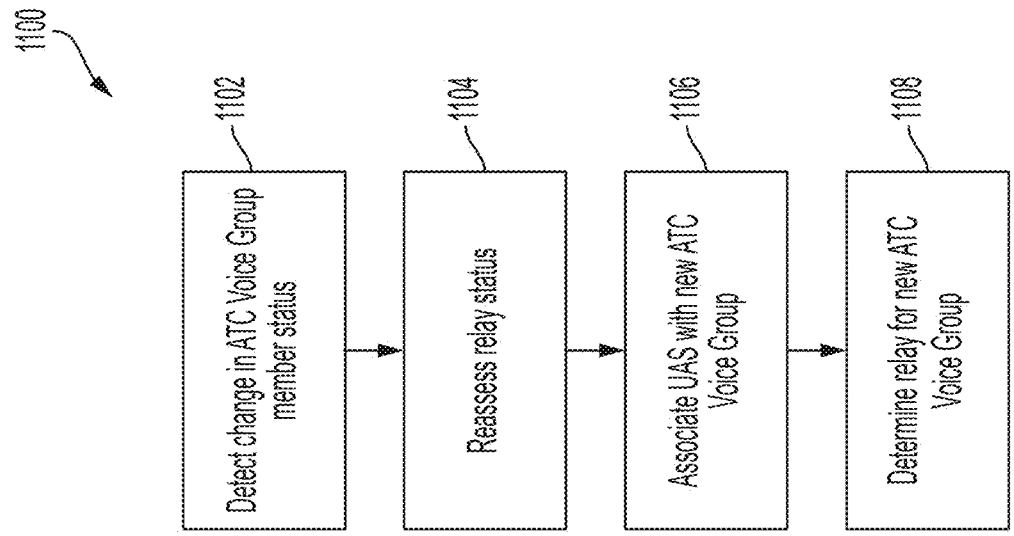
FIG. 11 illustrates an exemplary process for adjusting ATC voice group members according to examples of the disclosure.

Returning to the example of FIG. 10A, as a particular aircraft travels its intended flight plan, it may need to change voice groups for instance in order to communicate with a different ATC voice station. FIG. 11 illustrates an exemplary process for adjusting ATC voice group members according to examples of the disclosure. In one or more examples, the process 1100 of FIG. 11 can begin at step 1102 wherein the ATC voice processor detects a change in the ATC voice group status of a UAS operating on the aviation network. As an example, an ATC voice station may instruct a pilot to tune to a different ATC voice station based on the current position and trajectory of the UAS flight. As with manned aircraft, a controller at the ATC voice station, may issue a voice communication instructing the pilot to tune their ATC VHF radio to a new frequency. That message can be communicated to the pilot on the ground using, for examples, the process described above with respect to FIG. 8. In one or more examples, once the pilot receives the instruction to change the frequency, they may issue a command to their UAS to change the ATC VHF radio. In one or more examples, at step 1102, the ATC voice processor can detect the command to change the radio frequency, and thus detects that the ATC voice group that the UAS belongs to will have to be modified (to remove the UAS) and in one or more examples, the ATC voice group that the UAS is transitioning to will also have to be modified (to add the UAS). Additionally or alternatively, the ATC voice processor (in conjunction with the spectrum management system) can also be configured to detect when a flight is no longer in operation (for instance because it landed) thus triggering the ATC voice processor to detect a modification of an ATC voice group.

In one or more examples, once the change to the one or more ATC voice groups is detected at step 1102, the process 1100 can move to step 1104 wherein the relay status of the ATC group in which a UAS has been removed can be reassessed to determine whether another UAS of the ATC voice group should be designated as the relay. Thus, in one or more examples, using the flight plan information of each UAS in the ATC voice group, the ATC voice processor can determine the UAS in the voice group that has the strongest communications link with the ATC voice station (based on information provided by the spectrum management system), and designate the UAS with the strongest communications link to be the designated relay UAS of the voice group. In many instances, step 1104 may result in no change in the designated relay for the ATC voice group, especially if the UAS leaving the voice group was not the designated relay UAS.

In one or more examples, and in the event that the UAS leaving a voice group has transitioned to a new ATC voice station, then in one or more examples, the process 1100 can move to step 1106 wherein the ATC voice processor can associate the UAS with the ATC voice group associated with the ATC voice station that the UAS has now been tuned to. In one or more examples, the assignment of the UAS to its new voice group may only be carried out once it is confirmed that the ATC VHF radio of the UAS has changed its frequency to the ATC voice station associated with the voice group.

In one or more examples, once the UAS has been associated with its new ATC voice group, the process 1100 can move to step 1108 wherein the designated relay for the ATC voice group is determined, using the process described above with respect to step 1104. In one or more examples, the designated relay may remain unchanged even with the addition of the new UAS to the voice group, however, in one or more examples, if the new UAS to the voice group is determined to have the strongest link with the ATC voice station associated with the voice group, then the new UAS to the group may become the new designated relay for the group.

The systems and methods described above can ensure that that pilots connected to an UAS aviation network via a base station can have continuous access to an ATC voice station while they are connected to a base station in the UAS aviation network. However, in one or more examples, through system failure or pilot error (i.e., the pilot controls the aircraft so as to deviate from their planned route), a UAS may lose connectivity to a base station of the UAS aviation network or at least lose ATC voice transmission capability. This can lead to a situation in which a pilot is unable to communicate with ATC either because they are unable to receive ATC voice transmissions, their voice transmission to ATC are not properly communicated, or both. Losing the ability to communicate with ATC during a flight can lead to an unsafe situation for not only unmanned flights but also manned flights in a given airspace, since ATC would no long be able to provide instructions to the pilot or the pilot would not be able to provide ATC with information needed to maintain safety in the airspace.

Figure 12:
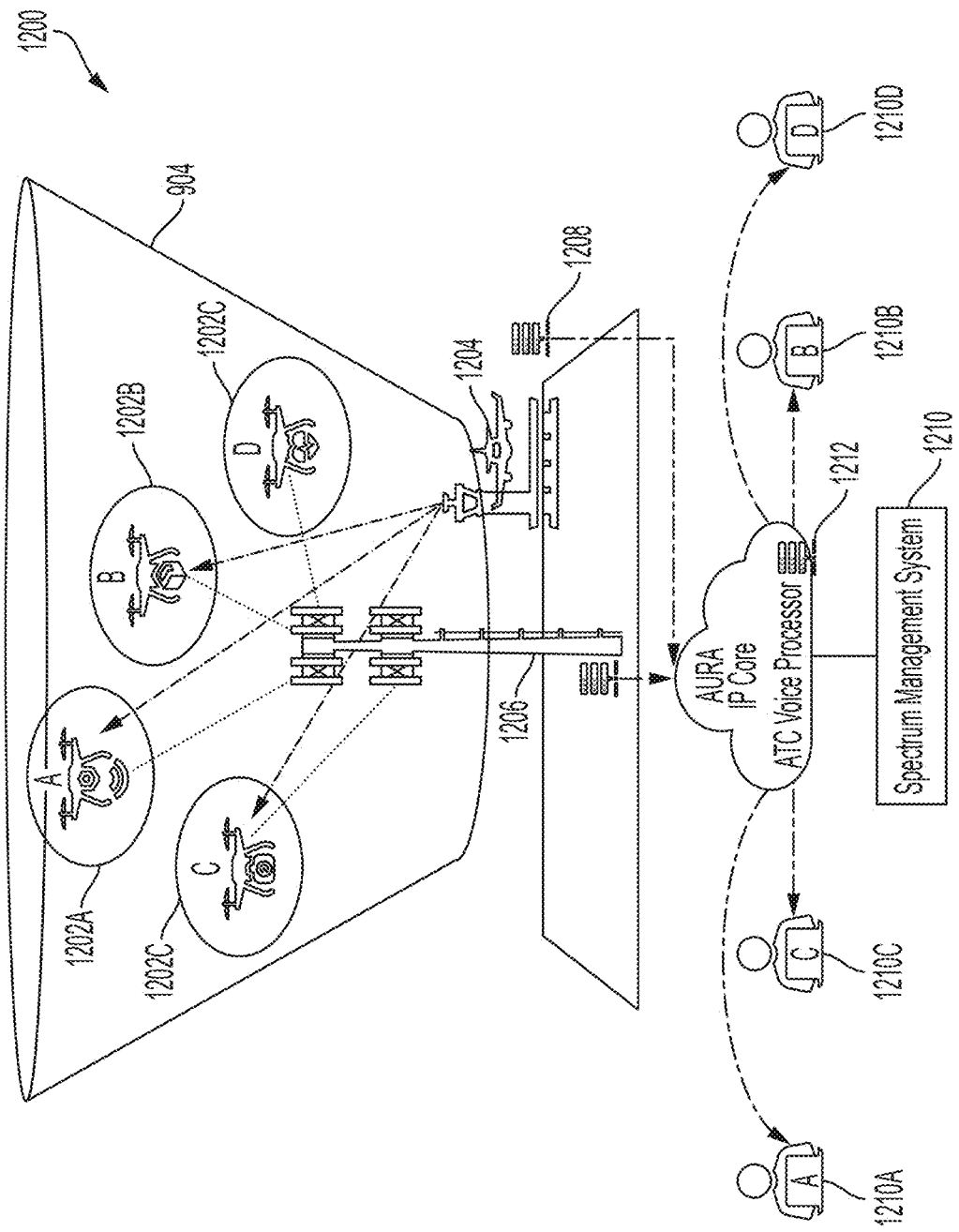
FIG. 12 illustrates another exemplary system for facilitating communications between unmanned aircraft system operators and ATC according to one or more examples of the disclosure.

Thus, in one or more examples, in order to build a robust system that can safely withstand ATC voice communications failure between a UAS in the aviation network and a base station, a terrestrial relay node can be provided as a fail-safe to ensure that a pilot can communicate with its assigned ATC voice station even in the event of a lost link between the UAS and ground base station. FIG. 12 illustrates an exemplary system for facilitating communications between unmanned aircraft system operators and ATC that includes a terrestrial relay node according to one or more examples of the disclosure. In one or more examples, the system can be substantially similar to the system 400 of FIG. 4. Thus, in one or more examples, the system can include a spectrum management system 1210, base station 1206, ATC voice processor 1212, and ATC voice station 1204 that can operate in substantially the same manner as their counterparts described above with respect to FIG. 4 so as to facilitate ATC voice communications between one or more pilots of an ATC voice group 1210A-D (each operating their respective UAS 1202A-D) and the ATC voice station 1204.

In one or more examples, and as described in further detail below, the system 1200 can also include a terrestrial relay node 1208, that can relay communications between the ATC voice station 1204 and the one or more pilots of the ATC voice group 1210A-D. In one or more examples, the terrestrial relay node 1208 can be located proximally to an ATC voice station 1204, such that it has the line of sight with the ATC voice station 1204 thus facilitating communications between the ATC voice station and the terrestrial relay node. Additionally, or alternatively, the terrestrial relay node 1208 can be located at the ATC voice station itself, and can transmit data to and receive data from the ATC voice station (including voice communications) via a wired/physical connection (such as Ethernet). In one or more examples, terrestrial relay node 1208 can be communicatively coupled to ATC voice processor 1212. In one or more examples, the terrestrial relay node 1208 can utilize an Ethernet/IP connection with ATC voice processor 1212 or use any other transportation medium that can transmit the analog voice transmission from the ATC voice station 1204 to the ATC voice processor 1212 via the terrestrial relay node 1208. In one or more examples, terrestrial node 1208 can receive analog voice transmissions from ATC voice station 1208 and convert the received analog transmission to a digital voice transmission using a vocoder that is part of the relay node 1208. Additionally or alternatively, the terrestrial relay node 1208 can be configured to relay analog voice communications to the ATC voice processor 1212, which can then convert the received analog transmission to digital voice data using a vocoder that is part of the ATC voice processor 1212. As described in detail below, the terrestrial relay node 1208 can be utilized for both pilot to ATC voice station, and ATC voice station to pilot communications during "lost-link" situations so as to ensure continuity of communications thereby acting a critical fail-safe for ATC voice communications.

As described above, in one or more examples, ATC voice transmission sent from an ATC voice station can be transmitted to a UAS in the ATC voice group associated with the ATC voice, which can act as a relay. The designated relay UAS can then transmit the received ATC voice traffic to a base station, which then send the transmission to an ATC voice processor that then distributes the transmission to all pilots in that ATC voice group (who are part of the network). However, the above communication scheme can be vulnerable if the relay UAS loses its ability to relay received ATC voice communications back to a base station of the aviation network. This can be especially true if an ATC voice group only includes one aircraft, such that if the UAS loses the ability to transmit ATC voice communications to the ground, the pilot may lose the ability to receive any ATC voice communications from its assigned ATC voice station. This could lead to an unsafe situation where the pilot would no longer be able to receive commands or any type of communication from ATC. Thus, in one or more examples, the terrestrial relay node 1208 described above can be used during a "lost link" scenario, to ensure that transmission from an ATC voice station ultimately make their way a pilot whose may otherwise not be able to receive the voice transmission due to their UAS losing ATC voice communications ability with the ground.

Figure 13:
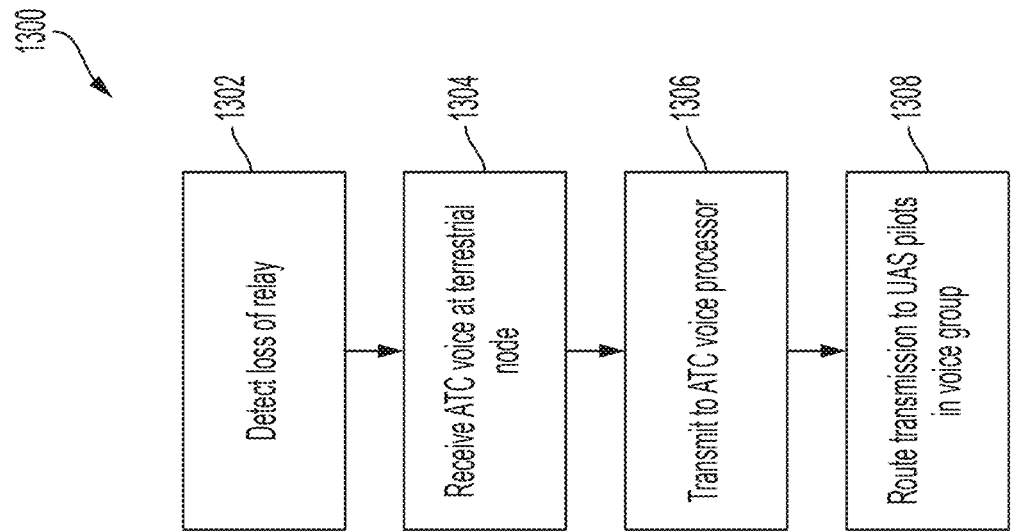
FIG. 13 illustrates another exemplary process for transmitting ATC voice communications to one or more pilots in an aviation network according to examples of the disclosure.

FIG. 13 illustrates another exemplary process for transmitting ATC voice communications to one or more pilots in an aviation network according to examples of the disclosure. In one or more examples, the process 1300 of FIG. 13 can illustrate an exemplary method for transmitting ATC voice station communications from an ATC voice station to a UAS pilot connected to a digital aviation network using a terrestrial relay node, such as terrestrial relay node 1208 of system 1200. In one or more examples, the process 1300 of FIG. 13 is presented as a being utilized in a "lost-link" scenario in which a communications link between a UAS and a ground base station is compromised thus invoking the terrestrial relay node to support communications, however the example should not be seen as limiting. Thus, in one or more examples, the process 1300 can also address any scenario in which using a terrestrial relay node may be desired.

In one or more examples, the process 1300 of FIG. 13 can begin at step 1302 wherein the system (for instance via the base station controller located at the base station in communication with a UAS) can detect the loss of a communications link between one or more UAS in an ATC voice group and a base station. For instance, in one or more examples, if an ATC voice group contains only one UAS, then at step 1302, the spectrum management system 1210 can detect when the UAS loses its ATC voice communications link to the network via the ground base station 1206. In one or more examples, detecting a "lost-link" can include the spectrum management system 1210 receiving an alert from ground base station 1206 (via a ground base station controller located at the ground based station). Additionally or alternatively, the spectrum management system 1210 can monitor the signals received from the ground base station 1206, and determine a lost-link condition relating to one or more aircraft being managed by the spectrum management system 1210. Alternatively and/or additionally, step 1302 can also include detecting the loss of a communications link between a designated relay UAS (described above with respect to FIG. 6) for an ATC voice group containing multiple UAS. Thus, in one or more examples, the spectrum management system 1210 or the base station controller can detect that the link between the ATC voice station and the pilots of the ATC voice group has been lost due to a communications link loss between the UAS and the ground.

In one or more examples, once the system has detected a lost link at step 1302, the process 1300 can move to step 1304 wherein a terrestrial link node such as terrestrial link node 1208 can receive a transmission from the ATC voice station. In one or more examples, and as described above, the terrestrial relay node can be configured to receive analog VHF voice communications from the ATC voice station. In one or more examples, once the ATC voice has been received by the terrestrial relay node at step 1304, the process 1300 can move to step 1306, wherein the terrestrial relay node can transmit the voice data to an ATC voice processor of a digital aviation network. As described above, the terrestrial relay node 1208 can be located in relation to the ATC voice station it is associated with so as to have the necessary line-of-sight needed to receive VHF communications from the ATC voice station or alternatively it can be located at the ATC voice station. In one or more examples, the terrestrial relay node can be located to receive VHF voice traffic from multiple ATC voice stations.

In one or more examples, once the ATC voice signal or transmission is received at the terrestrial relay node at step 1304, the process 1300 can move to step 1306 wherein the received signal is relayed or transmitted to an ATC voice processor of a digital aviation network. As described in detail above, the terrestrial relay node can be connected to the ATC voice processor using a wired and/or wireless communications link using any transportation medium that is suitable to transmit the data received at step 1304 in either its original form, or in some converted form that can be used by the ATC voice processor. In one or more examples, and as described above, the terrestrial relay node can include a vocoder that can convert the received analog voice transmission from an ATC voice station to a digital voice signal. In one or more examples, once the voice data has been transmitted to the ATC voice processor at step 1306, the process 1300 can move to step 1308 wherein the ATC voice processor can route the voice data to the UAS pilot's that are in the ATC voice group associated with the traffic (i.e., from the ATC voice station associated with ATC voice group).

Figure 14:
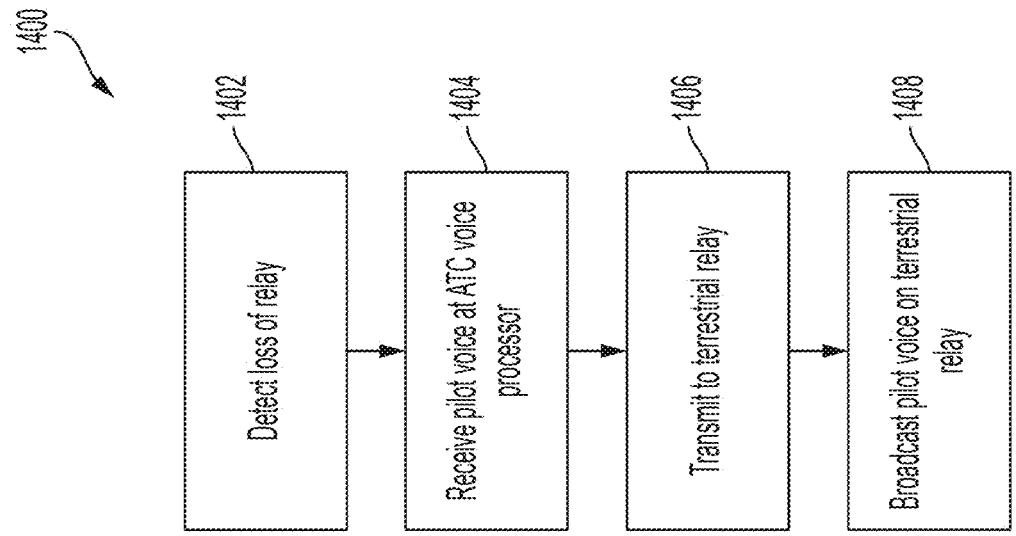
FIG. 14 illustrates another exemplary process for transmitting operator communications to an ATC voice station according to examples of the disclosure.

The process 1300 described above thus can allow for each pilot on the digital aviation network to continuously receive ATC voice traffic even if the ability to transmit ATC voice communications from a UAS to ATC Voice Station is compromised due to a lost-link. In one or more examples, the terrestrial relay node 1208 can also be utilized to provide continuity of communications for transmissions from a UAS pilot to the ATC voice traffic. FIG. 14 illustrates an exemplary process for transmitting operator communications to an ATC voice station according to examples of the disclosure. In one or more examples, the process 1400 of FIG. 14 can begin at step 1402 wherein the system (for instance via the ground base station and/or spectrum management system) can detect the loss of a communications link between one or more UAS in an ATC voice group and a base station. For instance, in one or more examples, if an ATC voice group contains only one UAS, then at step 1402, the Base Station 1210 can detect when the UAS loses its ATC voice communications link to the network via the ground base station 1206. As described above with respect to FIGS. 9 and 10 above, when a pilot of an ATC voice group sends a voice transmission to the ATC voice stations associated with its ATC voice group, the transmission can be routed to the ATC voice processor, which then send the transmission to the ground base station, when is then sent via an RF link to the UAS associated with pilot. As described above, the UAS then converts the signal to a VHF voice signal which is transmitted to the ATC voice station. However, the system and process described above can require a RF link between the ground base station and the UAS so as to ensure that the ATC voice station receives a pilot's transmission. In one or more examples, if there is a lost-link scenario in which the link between the ground and the UAS is compromised (or if the link between the UAS and the ATC voice station is compromised) then an unsafe situation can occur wherein a pilot may lose the ability to talk to an ATC voice station. Thus, in one or more examples, the process 1400 can be used in the event that a lost-link scenario is detected at step 1402.

In one or more examples, once a lost-link scenario has been detected at step 1402, the process 1400 can move to step 1404 wherein the pilot voice transmission is received at step 1404. Step 1404 can be substantially similar to step 1002 of FIG. 10A, which describes how the pilot's voice communication is transmitted to the ATC voice processor. In one or more examples, once the ATC voice processor receives the transmission at step 1404, the process 1400 can move to step 1406 wherein the transmission is multi-cast to the other pilots in the ATC voice group (as described above with respect to step 1004 of FIG. 10A) and can also be transmitted to the terrestrial relay node, such as terrestrial relay node 1208. In one or more examples, and as described above with respect to FIG. 12, the ATC voice processor can have a physical or wireless communication link with the terrestrial relay node that is configured to transmit pilot voice data to the terrestrial relay node.

In one or more examples, once the terrestrial relay node 1208 receives the pilot's communication from the ATC voice processor, the terrestrial relay node can convert the received signal to a VHF voice communication (if required) and can transmit the pilot's communication to the ATC voice station. In this way, the pilot's communication can still be received by an ATC voice station even if the communication link between the ATC voice station and a pilot through the pilot's UAS is compromised. In one or more examples, to avoid duplication of voice delivery, once any voice traffic is captured at the terrestrial relay node the pilots and the UAS on the specific VHF frequency can be blocked by the ATC processor from delivering messages to the ATC voice station. Blocking communications in this manner can ensure that an ATC voice station does not receive redundant messages, or that messages from each of the pilots do not interfere with one another.

As discussed in detail above, when a UAS pilot issues a voice transmission to an ATC voice group, it is desirable to have the UAS controlled by that pilot transmit the voice traffic via a VHF communications link using the UAS associated with the pilot to ensure that proximal aircraft (i.e., other aircraft in the voice group that may be in proximity to the UAS) can also receive the transmission. However, the process 1400 described above, by using the terrestrial relay node may mean that aircraft proximal to the UAS associated with the pilot may not receive the transmission due to line-of-sight issues with the terrestrial relay node. In one or more examples, this risk can be mitigated by locating the terrestrial relay node proximally to the ATC voice station such that if an aircraft has line-of-sight with the ATC voice station then it should also have line of sight with the terrestrial relay node. However, in or more examples, and additionally to and/or alternatively to the process described above with respect to FIG. 14, instead of using a terrestrial relay node to send pilot to ATC voice station communications, the spectrum management system 1210 can instead designate another UAS (not associated with the pilot send the transmission) to relay voice transmissions from a pilot to the ATC voice station.

Figure 15:
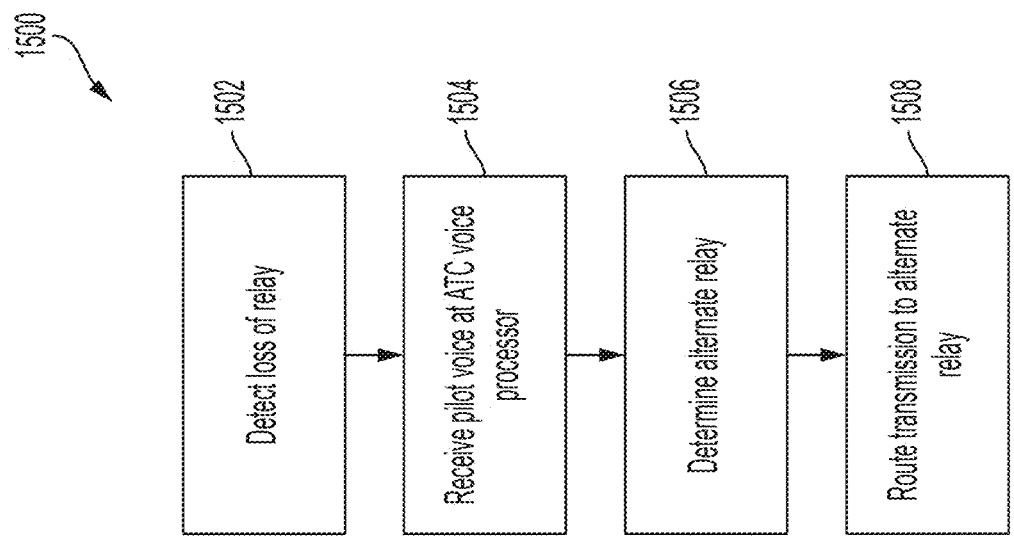
FIG. 15 illustrates another exemplary process for transmitting operator communications to an ATC voice station according to examples of the disclosure.

FIG. 15 illustrates another exemplary process for transmitting operator communications to an ATC voice station according to examples of the disclosure In one or more examples, the process 1500 of FIG. 15 can begin at step 1502 wherein the system (for instance via a spectrum management system or base station) can detect the loss of a communications link between one or more UAS in an ATC voice group and a base station. For instance, in one or more examples, if an ATC voice group contains only one UAS, then at step 1502, the spectrum management system 1210 can detect when the UAS loses its ATC voice communications link to the network via the ground base station 1206. As described above with respect to FIGS. 9 and 10 above, when a pilot of an ATC voice group sends a voice transmission to the ATC voice stations associated with its ATC voice group, the transmission can be routed to the ATC voice processor, which then send the transmission to the ground base station, when is then sent via an RF link to the UAS associated with pilot. As described above, the UAS then converts the signal to a VHF voice signal which is transmitted to the ATC voice station. However, the system and process described above can require a RF link between the ground base station and the UAS so as to ensure that the ATC voice station receives a pilot's transmission.

In one or more examples, once the loss of a UAS link between the ground and the UAS or the UAS and the ATC voice station is detected at step 1502, the process 1500 can move to step 1504 wherein an ATC voice processor such as ATC voice processor 1212 receives a voice transmission from a pilot associated with the UAS determined to have lost communication at step 1502. In one or more examples, and at step 1504 the ATC voice processor can multi-cast the received voice transmission to any other UAS pilots on the network that are assigned to the same ATC voice group as discussed above with respect to 1004 of FIG. 10A. However, since the ATC voice processor is aware that the communications link between the ground and the UAS, or the UAS and the ATC voice station has been compromised, in one or more examples at step 1506, the ATC voice processor as defined by the Spectrum Management Systems can determine an alternate UAS in the ATC voice group to use as a relay, to relay the transmissions from the UAS pilot whose communications link has been compromised. Thus, in one or more examples, in the event the a UAS pilot loses the ability to send ATC voice transmissions using their UAS, the system can route those transmissions using an alternate UAS (not associated with the pilot) to relay the voice transmissions to the ATC voice station. In one or more examples, the alternative relay node can be selected based on its location vis-à-vis the UAS of the pilot that has lost communications. In one or more examples, selecting an alternative relay UAS can include using the geofence information associated with each flight plan from the spectrum management system to determine which UAS in the ATC voice group has the highest quality communications link with the ATC voice station associated with the ATC voice group. In one or more examples, the spectrum management can not only use the geofence information created when determining RF availability for a flight, but can also use real-time spectral conditions to designate a relay aircraft, or provide that information to the ATC voice processor so that it can designate the relay. In this way, the UAS relay designated at step 1506 can represent the UAS with the lowest probability of link failure when communicating with the ATC voice station.

In one or more examples, once the relay has been designated at step 1506, the process 1500 can move to step 1508 wherein the pilot's voice transmission is transmitted to the alternate UAS relay, which then transmits the voice data to the ATC voice station using the systems and methods described above with respect to FIGS. 9-10. In one or more examples, the example processes 1400 and 1500 can both be employed by a spectrum management system in the event of a lost-link. For instance, in one or more examples a determination can be made as to whether it would be better to transmit a pilot's voice transmission using a terrestrial relay node or via an alternative UAS in the ATC voice group. In one or more examples, the determination can be made based on a variety of factors but not limited to, the proximity of an alternative UAS vis-à-vis the UAS of the pilot whose link has failed, the ability of other UAS in the ATC voice group to receive transmissions from the terrestrial relay node, and the availability of the terrestrial relay node to handle the pilot's voice transmission.

Figure 16:
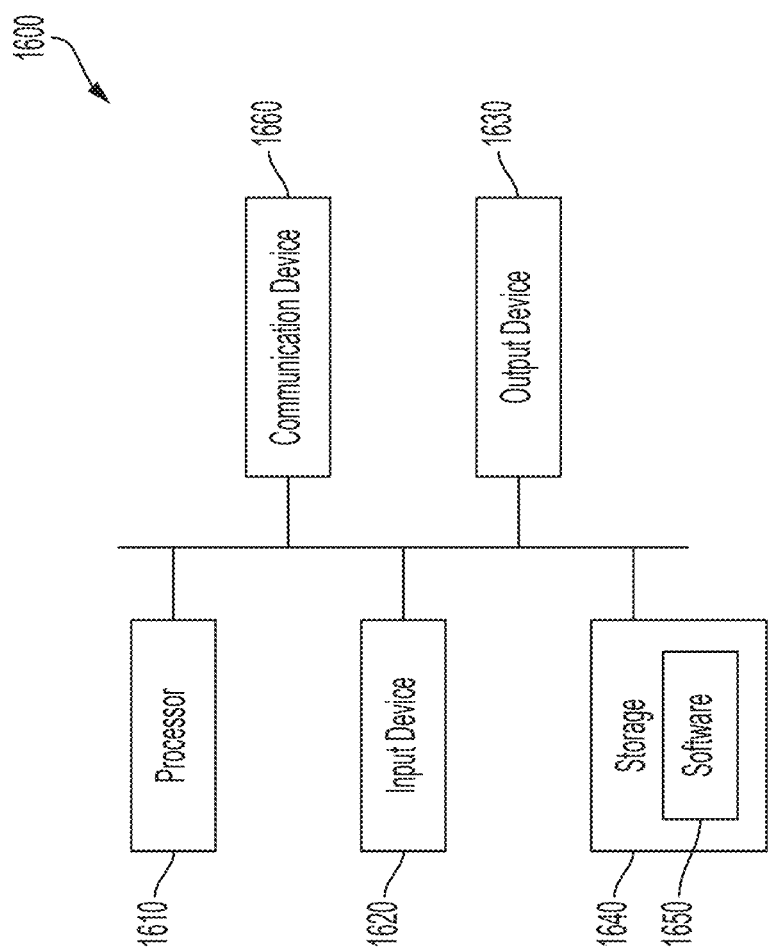
FIG. 16 illustrates an exemplary computing system, according to examples of the disclosure.

FIG. 16 illustrates an exemplary computing system, according to examples of the disclosure. FIG. 16 illustrates an example of a computing system 1600, in accordance with some embodiments system 1600 can be a client or a server. As shown in FIG. 16, system 1600 can be any suitable type of processor-based system, such as a personal computer, workstation, server, handheld computing device (portable electronic device) such as a phone or tablet, or dedicated device. The system 1600 can include, for example, one or more of input device 1620, output device 1630, one or more processors 1610, storage 1640, and communication device 1660. Input device 1620 and output device 1630 can generally correspond to those described above and can either be connectable or integrated with the computer.

Input device 1620 can be any suitable device that provides input, such as a touch screen, keyboard or keypad, mouse, gesture recognition component of a virtual/augmented reality system, or voice-recognition device. Output device 1630 can be or include any suitable device that provides output, such as a display, touch screen, haptics device, virtual/augmented reality display, or speaker.

Storage 1640 can be any suitable device that provides storage, such as an electrical, magnetic, or optical memory including a RAM, cache, hard drive, removable storage disk, or other non-transitory computer readable medium. Communication device 1660 can include any suitable device capable of transmitting and receiving signals over a network, such as a network interface chip or device. The components of the computing system 1600 can be connected in any suitable manner, such as via a physical bus or wirelessly.

Processor(s) 1610 can be any suitable processor or combination of processors, including any of, or any combination of, a central processing unit (CPU), field programmable gate array (FPGA), and application-specific integrated circuit (ASIC). Software 1650, which can be stored in storage 1640 and executed by one or more processors 1610, can include, for example, the programming that embodies the functionality or portions of the functionality of the present disclosure (e.g., as embodied in the devices as described above)

Software 1650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1640, that can contain or store programming for use by or in connection with an instruction execution system, apparatus, or device.

Software 1650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1600 can implement any operating system suitable for operating on the network. Software 1650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A system for facilitating voice communications between an air traffic control voice station and one or more pilots operating one or more aircraft in an air-to-ground communications network, the system comprising:
   a memory;
   one or more processors;
   wherein the memory stores one or more programs that when executed by the one or more processors, cause the one or more processors to:
   receive one or more flight plans associated with the one or more aircraft, wherein each flight plan comprises timing, location, and altitude information for a flight that is to fly in one or more coverage areas of the air-to-ground communications network;

for each aircraft of the one or more aircraft, determine an availability of an RF communications link, and an availability of an air traffic control (ATC) voice communications link based on the received one or more flight plans;

generate an RF communications link at a base station of the communications network between the aircraft and the pilot of the one or more pilots associated with the aircraft based on the received one or more flight plans;

assign each aircraft of the one or more aircraft to an air traffic control (ATC) voice group of a plurality of ATC voice groups, wherein each ATC voice group is configured such that an ATC voice station broadcasts voice communications from the ATC voice station to one or more pilots associated with the one or more aircraft of the ATC voice group; and generate a digital voice communication link with an aircraft of the one or more aircraft based on the assigned air traffic control (ATC) voice group of the aircraft and the received one or more flight plans.

2. The system of claim 1, wherein generating a digital voice communication link with an aircraft of the one or more aircraft comprises selecting the aircraft to act as a designated relay for the ATC voice group based on the received one or more flight plans associated with each aircraft that is assigned to the ATC voice group.

3. The system of claim 2, where the one or more processors are caused to:

receive an ATC digital voice communication from the designated relay aircraft over the digital voice communication link;

generate a plurality of copies of the received ATC voice digital voice communication; and transmit the plurality of copies of the received ATC voice digital communication to each pilot associated with the one or more aircraft in the ATC voice group.

4. The system of claim 3, wherein the ATC digital voice communication is based on an analog voice communication transmitted by the ATC voice station.

5. The system of claim 4, wherein the analog voice transmission is received by a radio located on the designated relay aircraft for the ATC voice group and is converted to the ATC digital voice communication using a converter located on the designated relay aircraft.

6. The system of claim 5, wherein the designated relay aircraft transmits the ATC digital voice communication to the system using the digital voice communication link.

7. The system of claim 1, wherein generating a digital voice communication link with an aircraft of the one or more aircraft comprises:

receiving an ATC digital voice communication from a pilot of the one or more pilots;

determining an aircraft of the one or more aircraft that is associated with the pilot;

and generating the digital voice communication link with the aircraft determined to be associated with the pilot.

8. The system of claim 7, wherein the one or processors are caused to:

generate a plurality of copies of the received ATC voice digital voice communication; and transmit the plurality of copies of the received ATC voice digital communication to each pilot associated with the one or more aircraft in the ATC voice group.

9. A method for facilitating voice communications between an air traffic control voice station and one or more pilots operating one or more aircraft in an air-to-ground communications network, the method comprising:

receiving one or more flight plans associated with the one or more aircraft, wherein each flight plan comprises timing, location, and altitude information for a flight that is to fly in one or more coverage areas of the air-to-ground communications network;

for each aircraft of the one or more aircraft, determine an availability of an RF communications link, and an availability of an air traffic control (ATC) voice communications link based on the received one or more flight plans;

generating an RF communications link at a base station of the communications network between the aircraft and the pilot of the one or more pilots associated with the aircraft based on the received one or more flight plans;

assigning each aircraft of the one or more aircraft to an air traffic control (ATC) voice group of a plurality of ATC voice groups, wherein each ATC voice group is configured such that an ATC voice station broadcasts voice communications from the ATC voice station to one or more pilots associated with the one or more aircraft of the ATC voice group; and generating a digital voice communication link with an aircraft of the one or more aircraft based on the assigned air traffic control (ATC) voice group of the aircraft and the received one or more flight plans.

10. The method of claim 9, wherein generating a digital voice communication link with an aircraft of the one or more aircraft comprises selecting the aircraft to act as a designated relay for the ATC voice group based on the received one or more flight plans associated with each aircraft that is assigned to the ATC voice group.

11. The method of claim 10, wherein the method comprises:

receiving an ATC digital voice communication from the designated relay aircraft over the digital voice communication link;

generating a plurality of copies of the received ATC voice digital voice communication; and transmitting the plurality of copies of the received ATC voice digital communication to each pilot associated with the one or more aircraft in the ATC voice group.

12. The method of claim 11, wherein the ATC digital voice communication is based on an analog voice communication transmitted by the ATC voice station.

13. The method of claim 12, wherein the analog voice transmission is received by a radio located on the designated relay aircraft for the ATC voice group, and to the ATC digital voice communication using a converter located on the designated relay aircraft.

14. The method of claim 13, wherein the designated relay aircraft transmits the ATC digital voice communication to the pilots using the digital voice communication link.

15. The method of claim 9, wherein generating a digital voice communication link with an aircraft of the one or more aircraft comprises:

receiving an ATC digital voice communication from a pilot of the one or more pilots;

determining an aircraft of the one or more aircraft that is associated with the pilot;

and generating the digital voice communication link with the aircraft determined to be associated with the pilot.

16. The method of claim 15, wherein the method comprises:
generating a plurality of copies of the received ATC voice digital voice communication; and
transmitting the plurality of copies of the received ATC voice digital communication to each pilot associated with the one or more aircraft in the ATC voice group.

17. A non-transitory computer-readable storage medium storing one or more programs for facilitating voice communications between an air traffic control voice station and one or more pilots operating one or more aircraft in an air-to-ground communications network, the one or more programs comprising instructions which, when executed by an electronic device with a display and a user input interface, cause the device to:
receive one or more flight plans associated with the one or more aircraft, wherein each flight plan comprises timing, location, and altitude information for a flight that is to fly in one or more coverage areas of the air-to-ground communications network;
for each aircraft of the one or more aircraft, determine an availability of an RF communications link, and an availability of an air traffic control (ATC) voice communications link based on the received one or more flight plans;
generate an RF communications link at a base station of the communications network between the aircraft and the pilot of the one or more pilots associated with the aircraft based on the received one or more flight plans;
assign each aircraft of the one or more aircraft to an air traffic control (ATC) voice group of a plurality of ATC voice groups, wherein each ATC voice group is configured such that an ATC voice station broadcasts voice communications from the ATC voice station to one or more pilots associated with the one or more aircraft of the ATC voice group; and
generate a digital voice communication link with an aircraft of the one or more aircraft based on the assigned air traffic control (ATC) voice group of the aircraft and the received one or more flight plans.

18. The computer-readable storage medium of claim 17, wherein generating a digital voice communication link with an aircraft of the one or more aircraft comprises selecting the aircraft to act as a designated relay for the ATC voice group based on the received one or more flight plans associated with each aircraft that is assigned to the ATC voice group.

19. The computer-readable storage medium of claim 18, where the device is caused to:
receive an ATC digital voice communication from the designated relay aircraft over the digital voice communication link;
generate a plurality of copies of the received ATC voice digital voice communication; and
transmit the plurality of copies of the received ATC voice digital communication to each pilot associated with the one or more aircraft in the ATC voice group.

20. The computer-readable storage medium of claim 19, wherein the ATC digital voice communication is based on an analog voice communication transmitted by the ATC voice station.

21. The computer-readable storage medium of claim 20, wherein the analog voice transmission is received by a radio located on the designated relay aircraft for the ATC voice group, and to the ATC digital voice communication using a converter located on the designated relay aircraft.

22. The computer-readable storage medium of claim 21, wherein the designated relay aircraft transmits the ATC digital voice communication to the device using the digital voice communication link.

23. The computer-readable storage medium of claim 17, wherein generating a digital voice communication link with an aircraft of the one or more aircraft comprises:
receiving an ATC digital voice communication from a pilot of the one or more pilots;
determining an aircraft of the one or more aircraft that is associated with the pilot;
and
generating the digital voice communication link with the aircraft determined to be associated with the pilot.

24. The computer-readable storage medium of claim 23, wherein the device is caused to:
generate a plurality of copies of the received ATC voice digital voice communication; and
transmit the plurality of copies of the received ATC voice digital communication to each pilot associated with the one or more aircraft in the ATC voice group.

* * * * *